United States Patent
McCutchen et al.

(10) Patent No.: US 9,611,556 B2
(45) Date of Patent: Apr. 4, 2017

(54) RADIAL COUNTERFLOW SHEAR ELECTROLYSIS

(71) Applicant: McCutchen Co., Portland, OR (US)

(72) Inventors: Wilmot H. McCutchen, Orinda, CA (US); David J. McCutchen, Portland, OR (US)

(73) Assignee: McCutchen Co., Portland, OR (US)

( * ) Notice: Subject to any disclaimer, the term of this patent is extended or adjusted under 35 U.S.C. 154(b) by 238 days.

(21) Appl. No.: 14/459,153

(22) Filed: Aug. 13, 2014

(65) Prior Publication Data

US 2014/0346055 A1   Nov. 27, 2014

Related U.S. Application Data

(62) Division of application No. 12/167,771, filed on Jul. 3, 2008, now abandoned.

(Continued)

(51) Int. Cl.
*C25B 1/00* (2006.01)
*C25B 1/02* (2006.01)
(Continued)

(52) U.S. Cl.
CPC .............. *C25B 9/125* (2013.01); *C25B 1/00* (2013.01); *C25B 1/02* (2013.01); *C25B 1/13* (2013.01);
(Continued)

(58) Field of Classification Search
CPC ....................................................... C25B 9/125
(Continued)

(56) References Cited

U.S. PATENT DOCUMENTS 406,968 A   7/1889   Tesla
3,366,564 A   1/1968   Allen
(Continued)

FOREIGN PATENT DOCUMENTS

WO   2008007750   1/2008

OTHER PUBLICATIONS

Bockris, J., et al., "On the Splitting of Water," Int. J. Hydrogen Energy, vol. 10, No. 30, pp. 179-201, 1985, Pergamon Press Ltd., Great Britain.

(Continued)

*Primary Examiner* — James Lin
*Assistant Examiner* — Brian W Cohen
(74) *Attorney, Agent, or Firm* — Marger Johnson

(57) ABSTRACT

Coaxial disk armatures, counter-rotating through an axial magnetic field, act as electrolysis electrodes and high shear centrifugal impellers for an axial feed. The feed can be carbon dioxide, water, methane, or other substances requiring electrolysis. Carbon dioxide and water can be processed into syngas and ozone continuously, enabling carbon and oxygen recycling at power plants. Within the space between the counter-rotating disk electrodes, a shear layer comprising a fractal tree network of radial vortices provides sink flow conduits for light fractions, such as syngas, radially inward while the heavy fractions, such as ozone and elemental carbon flow radially outward in boundary layers against the disks and beyond the disk periphery, where they are recovered as valuable products, such as carbon nanotubes.

18 Claims, 10 Drawing Sheets

Related U.S. Application Data

(60) Provisional application No. 61/026,963, filed on Feb. 7, 2008, provisional application No. 61/034,242, filed on Mar. 6, 2008.

(51) Int. Cl.
| | | |
|---|---|---|
| *C25B 1/13* | (2006.01) | |
| *C25B 1/24* | (2006.01) | |
| *C25B 9/12* | (2006.01) | |
| *C25D 17/00* | (2006.01) | |
| *C25D 17/10* | (2006.01) | |
| *C25D 11/02* | (2006.01) | |

(52) U.S. Cl.
CPC .............. *C25B 1/24* (2013.01); *C25D 11/024* (2013.01); *C25D 17/00* (2013.01); *C25D 17/10* (2013.01); *Y02E 60/368* (2013.01)

(58) Field of Classification Search
USPC .................................. 204/660–674, 554–573
See application file for complete search history.

(56) References Cited

U.S. PATENT DOCUMENTS

| | | |
|---|---|---|
| 3,464,672 A | 9/1969 | Massa |
| 3,465,187 A | 9/1969 | Breaux |
| 3,468,614 A | 9/1969 | Nilsson |
| 3,915,673 A | 10/1975 | Tamai et al. |
| 3,944,865 A | 3/1976 | Jewitt |
| 3,990,631 A | 11/1976 | Schall |
| 4,044,943 A | 8/1977 | Brown et al. |
| 4,076,617 A | 2/1978 | Bybel et al. |
| 4,125,439 A | 11/1978 | Fleischmann et al. |
| 4,184,084 A | 1/1980 | Crehore |
| 4,186,089 A | 1/1980 | Okada |
| 4,201,635 A | 5/1980 | Muller |
| 4,292,051 A | 9/1981 | Kime |
| 4,454,101 A | 6/1984 | Garrison et al. |
| 4,458,153 A | 7/1984 | Wesley |
| 4,604,109 A | 8/1986 | Koslow |
| 4,792,438 A | 12/1988 | Horikoshi |
| 4,832,918 A | 5/1989 | Horikoshi et al. |
| 4,846,780 A | 7/1989 | Galloway et al. |
| 4,925,557 A | 5/1990 | Ahlberg, Jr. et al. |
| 4,957,606 A | 9/1990 | Juvan |
| 4,992,246 A | 2/1991 | Serizawa et al. |
| 5,073,262 A | 12/1991 | Ahlberg et al. |
| 5,078,847 A | 1/1992 | Grosman et al. |
| 5,143,630 A | 9/1992 | Rolchigo |
| 5,232,726 A | 8/1993 | Clark et al. |
| 5,254,250 A | 10/1993 | Rolchigo et al. |
| 5,368,724 A | 11/1994 | Ayers et al. |
| 5,390,740 A | 2/1995 | Woerheide |
| 5,393,417 A | 2/1995 | Cox |
| 5,393,421 A | 2/1995 | Ohe |
| 5,451,825 A | 9/1995 | Strohm |
| 5,464,513 A | 11/1995 | Goriachev et al. |
| 5,481,149 A | 1/1996 | Kambe et al. |
| 5,494,585 A | 2/1996 | Cox |
| 5,534,118 A | 7/1996 | McCutchen |
| 5,578,280 A | 11/1996 | Kazi et al. |
| 5,587,618 A | 12/1996 | Hathaway |
| 5,607,562 A | 3/1997 | Shimamune et al. |
| 5,679,249 A | 10/1997 | Fendya et al. |
| 5,688,377 A | 11/1997 | McCutchen |
| 5,725,778 A | 3/1998 | Cho et al. |
| 5,746,789 A | 5/1998 | Wright et al. |
| 5,817,218 A | 10/1998 | Hayashi et al. |
| 5,851,375 A | 12/1998 | Bodger et al. |
| 5,851,407 A | 12/1998 | Bowman et al. |
| 5,882,530 A | 3/1999 | Chase et al. |
| 5,925,324 A | 7/1999 | Greer |
| 5,939,030 A | 8/1999 | Moxley et al. |
| 5,993,674 A | 11/1999 | Rolchigo et al. |
| 6,019,825 A | 2/2000 | Greene et al. |
| 6,051,905 A | 4/2000 | Clark |
| 6,106,713 A | 8/2000 | Miller et al. |
| 6,117,322 A | 9/2000 | Miller et al. |
| 6,149,573 A | 11/2000 | Berger et al. |
| 6,183,714 B1 | 2/2001 | Smalley et al. |
| 6,200,486 B1 | 3/2001 | Chahine et al. |
| 6,203,814 B1 | 3/2001 | Fisher et al. |
| 6,210,575 B1 | 4/2001 | Chase et al. |
| 6,221,260 B1 | 4/2001 | Chahine et al. |
| 6,245,299 B1 | 6/2001 | Shiloh et al. |
| 6,254,764 B1 | 7/2001 | Babington et al. |
| 6,261,525 B1 | 7/2001 | Minace |
| 6,264,898 B1 | 7/2001 | Ingram |
| 6,284,105 B1 | 9/2001 | Eliasson et al. |
| 6,376,558 B1 | 4/2002 | Bahner et al. |
| 6,451,175 B1 | 9/2002 | Lal |
| 6,468,499 B1 | 10/2002 | Balachandran et al. |
| 6,478,969 B2 | 11/2002 | Brantley et al. |
| 6,515,391 B2 | 2/2003 | Whitesell |
| RE38,130 E | 6/2003 | Adams |
| 6,603,233 B2 | 8/2003 | Strohm |
| 6,685,803 B2 | 2/2004 | Lazarovich |
| 6,716,269 B1 | 4/2004 | Graff |
| 6,716,335 B2 | 4/2004 | Takesako et al. |
| 6,737,099 B2 | 5/2004 | Guraya |
| 6,746,613 B2 | 6/2004 | Korenev |
| 6,765,949 B2 | 7/2004 | Chang |
| 6,774,335 B2 | 8/2004 | Yanobe et al. |
| 6,777,639 B2 | 8/2004 | Schroder et al. |
| 6,808,634 B1 | 10/2004 | Zegg |
| 6,827,820 B1 | 12/2004 | Meinander |
| 6,872,301 B2 | 3/2005 | Schepis |
| 6,875,351 B2 | 4/2005 | Arnaud |
| 6,916,418 B2 | 7/2005 | Baldasarre et al. |
| 6,916,425 B2 | 7/2005 | Lotz et al. |
| 6,923,890 B2 | 8/2005 | Ricatto et al. |
| 6,924,608 B2 | 8/2005 | Czernichowski et al. |
| 6,936,228 B2 | 8/2005 | Hirakata et al. |
| 6,966,874 B2 | 11/2005 | Cornay et al. |
| 6,979,433 B1 | 12/2005 | Saito et al. |
| 7,008,605 B1 | 3/2006 | Benavides |
| 7,029,584 B2 | 4/2006 | Blase et al. |
| 7,033,478 B2 | 4/2006 | Harde |
| 7,033,481 B1 | 4/2006 | Schlager et al. |
| 7,037,484 B1 | 5/2006 | Brandenburg |
| 7,041,144 B2 | 5/2006 | Kozyuk |
| 7,049,724 B2 | 5/2006 | Qu et al. |
| 7,052,667 B2 | 5/2006 | Loutfy et al. |
| 7,056,437 B2 | 6/2006 | Schmid et al. |
| 7,094,381 B1 | 8/2006 | Overton et al. |
| 7,097,676 B2 | 8/2006 | Wootan et al. |
| 7,128,816 B2 | 10/2006 | Denes et al. |
| 7,160,426 B2 | 1/2007 | Baosheng |
| 7,169,305 B2 | 1/2007 | Gomez |
| 7,183,515 B2 | 2/2007 | Miller et al. |
| 7,241,256 B2 | 7/2007 | Cornay et al. |
| 7,244,360 B2 | 7/2007 | Cho |
| 7,247,244 B2 | 7/2007 | Kozyuk |
| 7,262,384 B2 | 8/2007 | Jackson |
| 7,264,849 B2 | 9/2007 | Keshner et al. |
| 7,306,737 B2 | 12/2007 | Langenecker |
| 7,314,516 B2 | 1/2008 | Kozyuk et al. |
| 7,323,157 B2 | 1/2008 | Kinloch et al. |
| 7,374,685 B2 | 5/2008 | Sun |
| 7,374,693 B1 | 5/2008 | Routberg et al. |
| 7,374,731 B2 | 5/2008 | Wang et al. |
| 7,381,328 B2 | 6/2008 | Schrive et al. |
| 7,408,186 B2 | 8/2008 | Merkulov et al. |
| 7,419,603 B2 | 9/2008 | Cho |
| 7,479,325 B2 | 1/2009 | Fan et al. |
| 7,757,866 B2 * | 7/2010 | McCutchen ........... B01D 63/16 210/167.13 |
| 7,771,582 B2 | 8/2010 | Kazem |
| 7,883,580 B2 | 2/2011 | Barker et al. |
| 7,901,485 B2 * | 3/2011 | McCutchen ........... B01D 45/14 55/406 |
| 2003/0192831 A1 | 10/2003 | Langenecker |
| 2004/0007539 A1 | 1/2004 | Denes et al. |

(56) References Cited

U.S. PATENT DOCUMENTS

| | | |
|---|---|---|
| 2004/0144314 A1 | 7/2004 | David et al. |
| 2004/0151654 A1 | 8/2004 | Wei et al. |
| 2005/0006801 A1 | 1/2005 | Kinloch |
| 2005/0118090 A1 | 6/2005 | Shaffer et al. |
| 2005/0163696 A1 | 7/2005 | Uhm et al. |
| 2005/0170089 A1 | 8/2005 | Lashmore et al. |
| 2006/0057037 A1 | 3/2006 | Anazawa et al. |
| 2006/0127299 A1 | 6/2006 | Harbec et al. |
| 2006/0146644 A1 | 7/2006 | Holloway et al. |
| 2006/0244386 A1 | 11/2006 | Hooke et al. |
| 2006/0251564 A1 | 11/2006 | Kin et al. |
| 2007/0001462 A1 | 1/2007 | McNeil |
| 2007/0045168 A1 | 3/2007 | Levitt et al. |
| 2007/0048209 A1 | 3/2007 | Smalley et al. |
| 2007/0102111 A1 | 5/2007 | Monsma et al. |
| 2007/0163702 A1 | 7/2007 | Sullivan |
| 2007/0183959 A1 | 8/2007 | Charlier et al. |
| 2007/0224107 A1 | 9/2007 | Hikata |
| 2007/0237959 A1 | 10/2007 | Lemaire |
| 2008/0023338 A1 | 1/2008 | Stoots et al. |
| 2008/0170982 A1 | 7/2008 | Zhang et al. |
| 2009/0060827 A1 | 3/2009 | Vinciguerra et al. |
| 2009/0087371 A1 | 4/2009 | Jang et al. |
| 2009/0256175 A1 | 10/2009 | Kim et al. |

OTHER PUBLICATIONS

Hawkes, G., et al., INL/CON-06-11720 Preprint, "Three Dimensional CFD Model of a Planar Solid Oxide Electrolysis Cell for Co-Electrolysis of Steam and Carbon Dioxide," Nov. 2006, Idaho National Laboratory, Idaho, US, including 2 pg. INL flyer entitled Syntrolysis.

Indarto, A., "Kinetic of CO2 Reduction by Gliding Arc Plasma," Asian Journal of Water, Environment and Pollution, vol. 4, No. 1, pp. 191-194, Oct. 9, 2006.

Koziol, K., et al., "High-Performance Carbon Nantube Fiber," Science, vol. 318, pp. 1892-1895, Dec. 21, 2007.

Lee, S.J., et al., "Large scale synthesis of carbon nanotubes by plasma rotating arc discharge technique," Diamond and Related Materials 11, pp. 914-917, 2002, Elsevier Science B.V.

Perlmutter, Comparison of Gypsum Dewatering Technologies at Flue Gas Desulfurization Plants, Presented at the 45th ISA Power Industry Division (POWID) Conference San Diego, California Jun. 2-7, 2002, 9 pgs.

Tarrer, Development of a New Gravity Sedimentation Process for Dewatering Flue Gas Cleaning Wastes, EPA-600/S7-84-084, Sep. 1984, 5 pgs.

Notification of Transmittal of the International Search Report and the Written Opinion of the International Searching Authority, or the Declaration, Feb. 9, 2009, PCT/US08/85916, 13 pages.

Keider, et al., "On the Conditions of Carbon Nanotube Growth in the Arc Discharge," Nanotechnology vol. 15 Issue 11, Oct. 1, 2004, pp. 1571-1575.

Nojeh, A., et al., "Electric-Field-Directed Growth of Carbon Nanotubes in Two Dimensions", Journal of Vacuum Science & Technology B, vol. 22 Issue 6, 2004, pp. 3421-3425, American Vacuum Society.

Oon, C.H., et al., "In Situ nanowire growth for electrical interconnects", Nanotechnology, 2004,vol. 15 No. 5, pp. 687-691.

Britt, Robert Roy, "The Worlds Smallest Motor," Apr. 12, 2005, retrieved at http://www.livescience.com/6969-world-smallest-motor.html.

Kalra, C.S. et al., "Gliding arc in tornado using a reverse vortex flow," Review of Scientific Instruments 76, 025110, pp. 1-7, Jan. 21, 2005, American Institute of Physics.

Hinkov, S., et al., "Optical Plasma Control During Arc Carbon Nanotube Growth" 2001, Proceedings of the Sixth Applied Diamond Conference/Second Frontier Carbon Technology Joint Conference (ADC/FCT 2001).

Chen, J. et al., "Fractal-like free networks Increasing the permeability," Physical Review E 75, 056301 (2007) pp. 1-8.

Zandbergen, P., Dijkstra D., "Von Karman Swirling Flows," Annual Reviews Fluid Mech. (1987), 19:465-491.

Hnatiuc, E. et al., "Cold Plasma Electrochemical Reactor with Rotary Discharge," retrieved at http://www.ut.ee/hakone8/papers/T6/Hnatiuc1(TP).pdf, Jul. 31, 2003, pp. 181-198.

Czernichowski, A., "GlidArc Assisted Preparation of the Synthesis Gas from Natural and Waste Hydrocarbons Gases," Oil & Gas Science Technology- Rev. IFP, vol. 56 No. 2 (2001), pp. 181-198.

Tesla, N., "Notes on a Unipolar Dynamo," The Electrical Engineer, Sep. 2, 1891, pp. 23-26.

Young, I., et al., "Physical Water Treatment for the Mitigation of Mineral Fouling in Cooling-Tower Water Applications," 2003 ECI Conference on Heat Exchanger Fouling and Cleaning: Fundamental Applications (2004), pp. 20-31.

Kronenberg, K., "Experimental Evidence for Effects of Magnetic Fields on Moving Water," IEEE Transactions on Magnetics, vol. MAG-21, No. 5, Sep. 1985 pp. 2059-2061.

Lebovka, N., Vorobiev, E., "The kinetics of inactivation of spheroidal microbial cells by pulsed electric fields," arXiv 0704.2750v1, Apr. 20, 2007, pp. 1-22.

Khachatryan, A., et al., "Graphite-to-diamond transformation induced by ultrasound cavitation," Diamond & Related Materials 17 (2008), pp. 931-936.

Van Der Walt, E., Grundingh, M., "The use of UV in combination with physical unit processes for treatment of raw water in small or rural communities," retreived at www.svargo-us.org, Nov. 18, 2007, pp. 1-6.

Neff, R., "Applying magneto-hydrodynamic physics to water purification," IBM Innovation to Be Greener Competition, The National Society of High school Scholars, Apr. 30, 2008, pp. 1-7.

Flannigan, D. et al., "Sonochemistry and sonoluminescense in ionic liquids, molten salts, and concentrated electrolyte solutions," Journal of Organometallic Chemistry 690 (2005), pp. 3513-3517.

UOP, "FCC Vortex Separation Technology: the VDS (TM) Design," retrieved at www.uop.com (2003) pp. 1-3.

Konno, A., et al., "Observation of cavitation bubble collapse by high-speed video," retrieved at www.fluid.mech.kogakuin.ac.jp, Dec. 11, 2003, pp. 1-6.

Rosa, E., "Cavitation pressure of water," http://matdl.org/repository/list.php?cat=quick_filter&search_keye%5B0%5D=cavitation+pressure (2007), pp. 1-3.

Leszcynska, D., Ahmad H., "Toxic elements in soil and groundwater: Short-term study on electrokinetic removal of arsenic in the presense of other ions," International Journal of Environmental Research and Public Health (2006), pp. 196-201.

Kim, S., et al., "Seed crystalization with cavitation for enhanced removal of calcium in water," J. Ind. Eng. Chem, vol. 13, No. 1 (2007), pp. 79-83.

Loske, A., et al., "Bactericidal effect of underwater shock waves," retrieved at http://www.sea-acustica.es/Sevilla02/ult01012, Sep. 2002, pp. 1-5.

Daniels, D., "Put a lid on rising chemical costs," Power, Sep. 15, 2008. pp. 1-9.

Gupta, S., "Investigation of a physical disinfection process based on pulsed underwater corona discharges," retrieved at FZKA 7336 digbib.ubka.uni-karlsruhe.de/volitexte/documetns/23373.pdf, Sep. 2007, pp. 1-135.

Schtern, V., Hussain, F., "Collapse, Symmetry, Breaking and Hysteresis in Swirling Flows," Annu. Rev. Fluid Mech. (1999) 31:537-566.

Extended European Search Report from related European Patent Application No. 09 717 985.7, issued Oct. 4, 2013, 4 pages, European Patent Office, The Hague, Netherlands.

Koziol et al., "High-Performance Carbon Nanotube Fiber", Science Express, 10.1261147635, Nov. 15, 2007, pp. 1-6.

Koziol et al., Cambridgenanotube1147635s1.mpg (identified as "Movie S1" in Koziol et al., High-Performance Carbon Nanotube Fiber, Science Express, 10.1261147635, Nov. 15, 2007, pp. 1-6.), CD-R, IBM-PC, MS Windows, 2.22 MB.

(56) References Cited

OTHER PUBLICATIONS

Lu et al., "A Technique for the Manufacture of Long Hollow Diamond Fibers by Chemical Vapor Deposition", Journal of Materials Science Letters, 14, 1995, pp. 1448-1450.
Bellucci et al., "Study of Field Emission of Multi-Walled C Nanotubes Synthesized by Arc Discharge", J. Phys.: Condens. Matter 19 (2007) 395014 (7pp.), retrieved Mar. 20, 2009 from the Internet: URL<http://www.iop.org/EJ/abstract/0953-8984/19/39/395014>, Abstract.

* cited by examiner

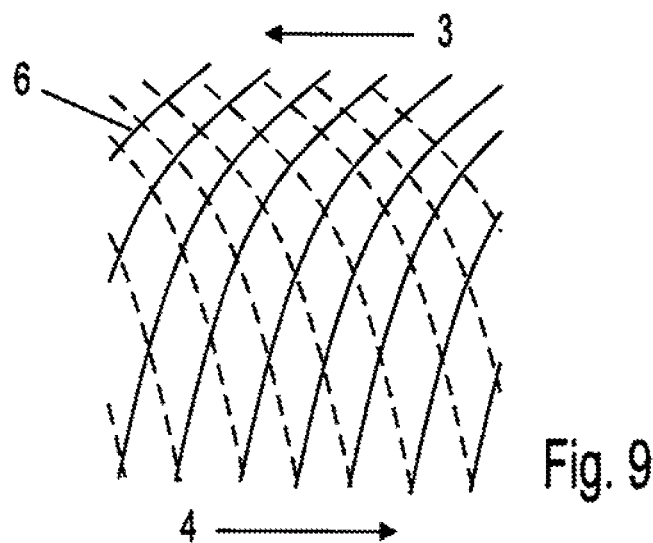
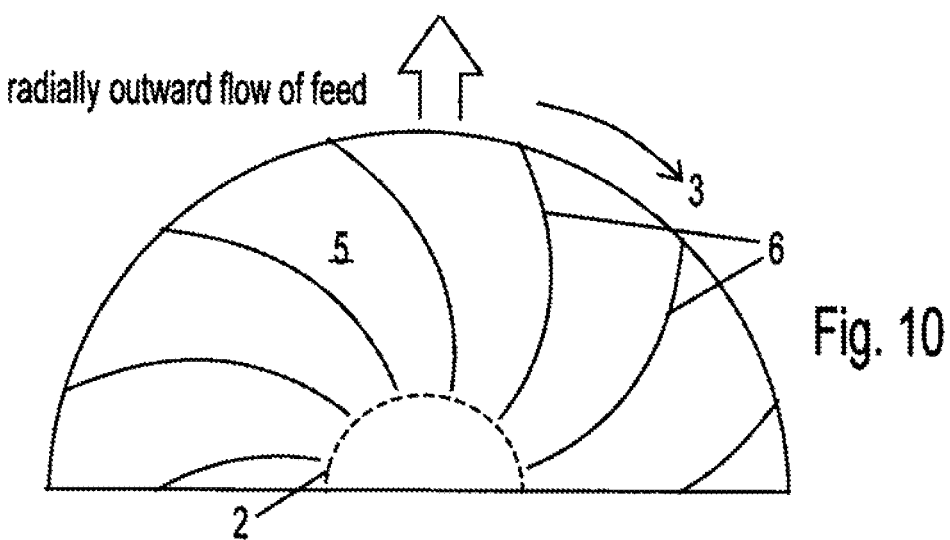

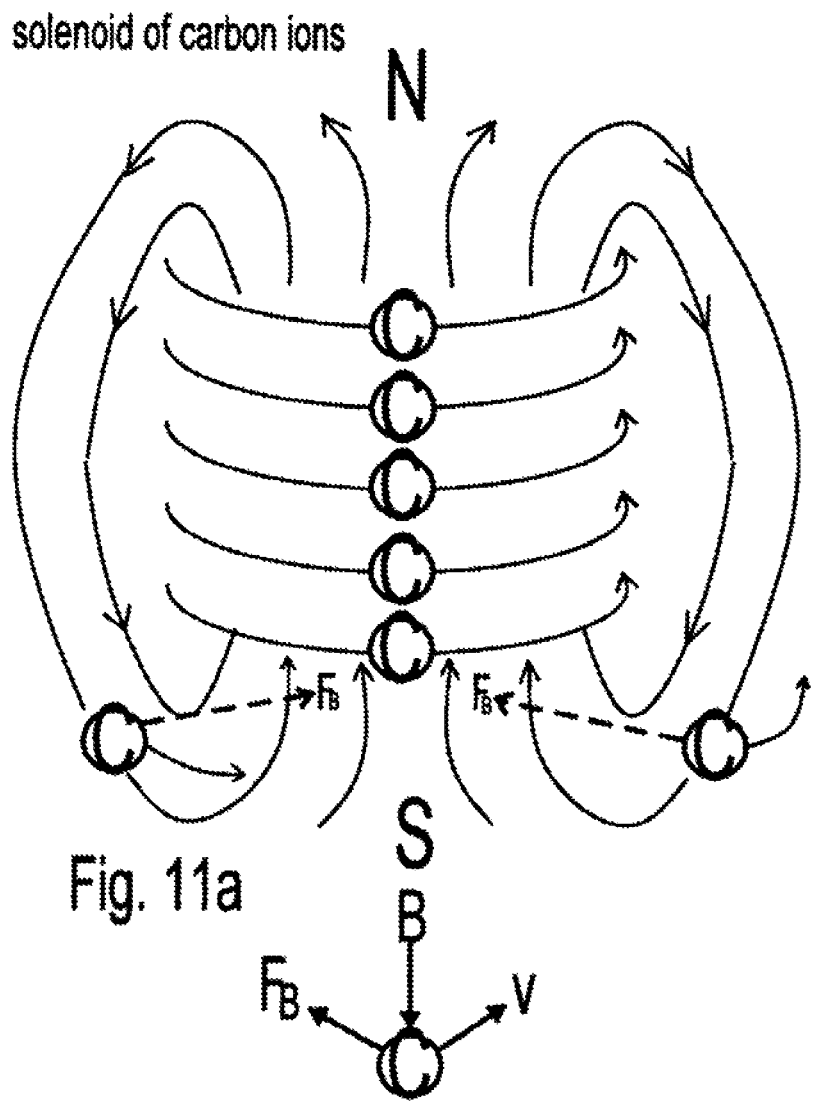

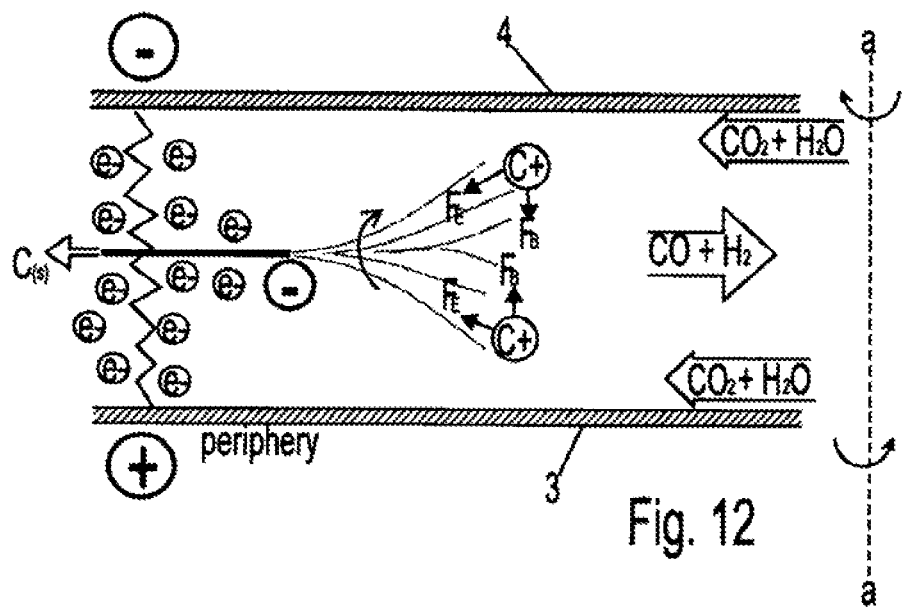
Fig. 12
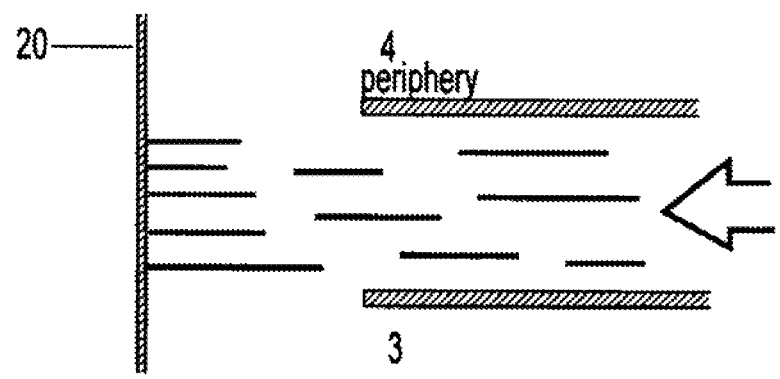
embedding nanostructures in a substrate  Fig. 17 inter-disk annular B field trans-disk axial B field into page annealing of nanotubes opposed conductive portions counter-rotate through axial B field out of page shear electrolysis of water

RADIAL COUNTERFLOW SHEAR ELECTROLYSIS

APPLICATION HISTORY

This application is a divisional of co-pending U.S. patent application Ser. No. 12/167,771, filed Jul. 3, 2008, which claims the benefit of U.S. Provisional Patent Applications Nos. 61/034,242 filed Mar. 6, 2008 and 61/026,963 filed Feb. 7, 2008.

FIELD OF THE INVENTION

This invention applies to mechanically-assisted electrolytic dissociation in a continuous process. One particular application of the reactor according to the present invention is simultaneous electrolysis of carbon dioxide and water to produce syngas, a mixture of carbon monoxide and hydrogen, thus providing means for carbon and oxygen recycling at IGCC power plants. Another application is electrolysis of water or methane to produce hydrogen for fuel. Yet another application is cracking of $CO_2$ as an alternative to carbon sequestration. And another application is high volume continuous synthesis of carbon or other nanotubes.

BACKGROUND OF THE INVENTION

Carbon Dioxide Emissions.

It is generally agreed that carbon dioxide emissions must be brought under control, but technology has not kept pace with policy. Of particular concern are coal-fired electric power plants, which are indispensable providers of electricity. Non-hydro renewables, such as wind and solar, are negligible sources of power, less than half a percent of coal for the U.S. in 2006. There is no economical means for carbon capture and sequestration at coal plants.

Alarm over global climate change has led to plans for a carbon tax projected between $20-200 per ton of carbon dioxide. Owners of existing coal plants may reasonably elect not to do anything to reduce emissions, but instead pay any carbon tax and pass on the cost to utility customers in a rate increase. Amine scrubbing and underground storage, the leading current proposals for carbon capture and sequestration, would be prohibitively expensive, and there is good reason to doubt that they would be reliable. Flue gas from coal plants contains fly ash, a large nitrogen ballast, and NOx and SOx which are acid precursors. The volume of the waste stream is overwhelmingly large.

There must be some economic incentive other than a punitive tax if there is to be a widely adopted remediation program to avert catastrophic global climate change from uncontrolled $CO_2$ emissions. The present invention offers a positive incentive to curb carbon dioxide emissions by turning $CO_2$ from waste to resource.

IGCC Power Plants

Integrated Gasification Combined Cycle (IGCC) power plants convert coal or biomass, by means of a process called gasification, into combustible syngas (a mixture of carbon monoxide (CO) and hydrogen ($H_2$)). The combined cycles are: (1) a Brayton cycle (where exhaust gas from syngas combustion drives a gas turbine), and (2) a Rankine cycle (a steam turbine, where the waste heat from the gas turbine is used for steam). For the same energy output, an IGCC plant needs 10-20% less fuel than a large-scale pulverized coal power plant. IGCC plants also use about 30% less water than coal fired power plants. The area occupied by IGCC plants is much smaller.

Gasification is a process that converts carbonaceous material into syngas. Even high sulfur coal, lignite, plastic, and landfill can be fuel for IGCC. Gasifiers can be operated as air-blown or oxygen-blown. The air-blown gasifier is inferior to the gasifier which uses pure oxygen. The fuel conversion efficiency of the air-blown gasifier is only 46% vs. 79%, and the energy density, or heating value, of the syngas produced is only 5.3 MJ/kg vs. 12.55 MJ/kg. The oxygen for oxygen-blown gasification is conventionally extracted from the air by cryogenic distillation, a large energy drain.

Along with syngas, the gasification process produces carbon dioxide ($CO_2$). Capturing carbon dioxide after gasification in an oxygen-blown gasifier is easier than post-combustion flue gas carbon capture or pre-combustion capture from an air-blown gasifier because of the absence of nitrogen ballast. Air is 78% nitrogen ($N_2$), and this inert fraction in air or flue gas is called nitrogen ballast. Exhaust gas from syngas combustion to run the gas turbine also contains $CO_2$, which must be captured as well. Amine scrubbing is one method for carbon capture, and chilled ammonia is another.

Carbon Sequestration.

Once carbon dioxide has been captured, something must be done with it. The follow-on to carbon capture is called sequestration. As envisioned presently by policymakers, sequestration is a concealed dumping scheme. The object is to store the carbon dioxide underground or in the ocean instead of in the atmosphere. The enormous volume and weight that must be transported and injected, and the lack of any assurance that the carbon dump will remain secure, should give preference to some sort of treatment at the plant instead of dumping, but presently no carbon dioxide treatment is feasible for the large volumes of hot and dirty waste gas emitted by utilities and industries.

If all of the carbon dioxide emitted by one average 250-MW coal-fired electric power plant in a year were captured, there would be 1.7 million metric tons to dispose of. The density of carbon dioxide gas is 1.98 $kg/m^3$ at standard temperature and pressure so each metric ton (1000 kg) of $CO_2$ at sea level pressure on a warm day occupies 554 cubic meters, about the size of a house. Each year, the carbon dioxide waste stream from this average coal plant would fill a cubic kilometer.

Large coal plants emit as much as 6 million tons per year. Cement plants and refineries and steel mills are also heavy polluters. For example, the Shell Martinez Refinery in the San Francisco Bay Area dumps over 4.4 million metric tons of $CO_2$ into the atmosphere each year. The total $CO_2$ load from the U.S. was over 6 billion metric tons in 2005. That's over 3 trillion cubic meters, or 117 trillion cubic feet. Transporting that much weight and putting that much volume underground every year would be an expensive undertaking.

Buried carbon dioxide gas may percolate back to the surface and leak out to harm people or at least escape into the atmosphere. The experience with sequestering nuclear waste in the United States should be instructive as to the political feasibility of any sequestration scheme. Nuclear waste is still without a site for permanent sequestration, and its volume is minuscule compared to the volume of carbon dioxide waste from only one plant. The citizens of Nevada have firmly declined the honor of hosting a nuclear waste dump at *Yucca* Mountain, and the same reaction can be expected elsewhere for carbon dumps.

If the pressure is increased to cram more carbon dioxide into available dump space, the danger of leaks, migrations, and eruptions increases. When the likelihood of human error, dishonesty, and greed—as well as earthquakes and other natural disasters—are considered as well, there no reason to expect that public approval can be obtained for siting carbon dumps.

In summary, sequestration is not only prohibitively expensive but also not feasible as a long term solution. A way must be found to transform $CO_2$ into harmless materials. Best of all would be a way to transform carbon dioxide into something useful, like syngas or carbon nanotubes (tubular fullerenes). That is an object of the present invention.

Syngas Synthesis by Simultaneous Electrolysis of CO2 and Water.

Syngas is a mixture of carbon monoxide (CO) and hydrogen ($H_2$) which can be burned directly or used as a feedstock to make synthetic fuel, lubricants, or plastics using the well-known Fischer-Tropsch synthesis process. Carbon dioxide cracking to syngas could provide means for carbon recycling at power plants, using the energy density (heating value) of syngas thus recovered for direct combustion to help power the gas turbine. Or the syngas could be synthesized to make vehicle fuel. The energy density of syngas ranges from 5 to 12 MJ/kg depending on the process used in gasification (oxygen-blown yielding the highest energy density, for superior combustion). For purposes of comparison, the energy density of natural gas is 45 MJ/kg; gasoline is 46.9 MJ/kg, or 34.6 MJ/l (131 MJ/gallon); lignite is 14-19 MJ/kg; and wood is 6-17 MJ/kg.

The recovered energy from carbon recycling might justify carbon dioxide treatment economically, should taxes and scolding prove ineffective in motivating power producers and others to reduce $CO_2$ emissions. The energy density (heating value) of bituminous coal is 24 MJ/kg. Therefore, recovered syngas at 12 MJ/kg would recover half the energy of coal. The mitigation of the coal cost by carbon recycling would offset some of the cost of carbon dioxide treatment. Moreover, carbon dioxide treatment would avoid the prohibitive costs and other problems of carbon sequestration. Not only coal plants but also natural gas plants could use carbon recycling to offset the cost of carbon dioxide treatment.

Oxygen, as well as carbon, could be recycled if carbon dioxide cracking were available. Pure oxygen is preferable to air in the gasification process because it avoids the nitrogen ballast problem and produces syngas having a higher energy density (approximately 12 MJ/kg). For IGCC, an air separator is used to produce oxygen for oxygen-blown gasification. The air separator accounts for approximately 30% of the operation and maintenance cost of the plant. The mitigation of the air separator cost by means of oxygen recycling would offset the cost of carbon dioxide treatment.

The Idaho National Laboratory has developed a process, which they have dubbed "syntrolysis," for syngas synthesis by means of simultaneous electrolysis of carbon dioxide and steam at high temperature (830° C.) in a static cell of exotic metals and ceramic materials. The cell is not only expensive, but small. For high volumes of carbon dioxide, the scalability of syntrolysis according to this setup remains unclear.

An object of the present invention is to provide a carbon dioxide cracker which will be able to continuously process voluminous $CO_2$ waste streams into valuable products, such as syngas and nanostructures such as carbon nanotubes.

Electrolytic Dissociation of Waste Gases.

The required energy for molecular dissociation, also known as cracking, can be transferred in many forms, including heat, mechanical, or electrical energy. Electrical energy can be transferred in an arc discharge, as in the case of lightning transforming oxygen into ozone. Normally, gases such as carbon dioxide are nonconductive, but a strong enough electric field dissociates electrons from molecules, a process called ionization, leaving a mix of positively charged ions and free electrons called a plasma. Plasma is a good conductor, so a current flows through the ionized gas in an arc discharge. The arc discharge transfers energy into the gas and increases ionization.

The rate of energy transfer into the gas, by resistive dissipation, is proportional to the square of the current according to the formula $P=I^2R$, where P is power, I is current, and R is resistance to current flow through the gas between the electrodes. Arc discharges which connect the anode and the cathode are undesirable not only because they result in a short circuit of the energy so it does not get dissipated into the gas, but also they cause electrode erosion. The conventional approach to preventing these problems is to interpose a dielectric such as glass between the feed gas and the electrode, as practiced in dielectric barrier discharge (DBD) reactors which are well known in the art of ozonizers. The dielectric barrier has charges distributed evenly over its surface in contact with the feed gas, so there is no local charge concentration, as in a bare metal electrode, which could cause arcing and erosion. The discharge from the dielectric is a multitude of filaments, called a glow or a corona, rather than one concentrated arc. The filamentary currents transfer electrical energy into the gas in a multitude of tiny paths, which is good for resistive dissipation. However, the interposed resistance of the dielectric weakens the E field in the gas between the electrodes, so the electromotive force driving electrical energy into the gas is weak.

Thermal plasma processes, which require high pressures, are impractical for carbon dioxide cracking on an industrial scale. An alternative is the plasma process is called cold or nonisothermal because although electron temperature is thousands of degrees, as in a thermal plasma, the gas temperature is moderate because the gas has not come to thermal equilibrium with the electrons. The fluorescent light is one example. Low (atmospheric) pressure means that the gas molecules excited by electron collisions cannot bump into each other frequently enough to come to thermal equilibrium.

The gliding arc (glidarc) cold plasma reactor operates at approximately atmospheric pressure, and uses transient arcs between the electrodes to transfer energy into the gas for cracking. The weakening resistance of a dielectric barrier is avoided. Instead of a dielectric barrier, the motion of the arc prevents a concentrated arc discharge and thus protects the electrodes from erosion and diffuses electrical energy into the feed gas. Convective cooling of flowing gas between divergent electrodes keeps gas temperature moderate. Glidarc solves the electrode erosion problem by moving the arc along with the gas through which it conducts, thereby moving the arc ends so they do not dwell and erode the electrodes. Glidarc reactors known to the art operate at high voltage with low current. An improved version of glidarc (Glidarc II) comprises one rotating cylindrical electrode nested with a coaxial static electrode, and axial feed flow between the electrodes. A. Czernichowski, et al., U.S. Pat. No. 6,924,608 (2005).

Glidarc reactors have been investigated as means for carbon dioxide cracking to syngas. A. Czernichowski, *Oil & Gas Science and Technology—Rev. IFP*, Vol. 56, p. 181, pp. 189-196 (2001).

Another improved glidarc reactor, operating at high voltage, incorporates the principle of reverse vortex flow (axial counterflow, as in a cyclone) as practiced in the Ranque-Hilsch vortex tube. Tangentially jetted feed swirls down a tube and then rebounds through a ring cathode at the bottom of the tube up to a disk anode at the top of the tube, in an axial plasma jet. The tube could be held by a bare hand, dramatically demonstrating its cold plasma character. C. S. Kalra, et al., *Rev. Sci. Instruments* 76, 025110 (2005).

A disadvantage of known glidarc reactors is that residence time of feed gas in the processing zone between the electrodes is short. Feed gas just blows through, which is necessary to move the arc so as to prevent electrode erosion. Improving feed residence time of cold plasma or glidarc reactors is another object of the present invention.

The Glidarc II discussed above and the reactor disclosed by Hayashi, et al., U.S. Pat. No. 5,817,218 (1998) are examples of reactors where there is shear between the electrodes, using shear instead of pressurized gas flow to prevent erosion. Both show a single moving electrode. In the Glidarc II the rotating electrode is cylindrical. Hayashi shows a cold plasma reactor comprising a rotating disk electrode having a layer of catalyst and opposed to a catalyst-coated stationary plate electrode. Feed is peripheral to the turbulent gap between the electrodes. Alternating current at 30-50 kHz is applied to the Hayashi electrodes to create the plasma, although direct current may be used. A reactor for electrolysis comprising an axially fed workspace between co-rotating disk electrodes is disclosed by Fleischmann, et al. U.S. Pat. No. 4,125,439 (1978). Separation of electrolysis products in the Fleischmann, et al. device is by means of an annular splitter disposed between the electrodes.

A need exists for a reactor which has a high rate of energy transfer to the feed, a long residence time of feed between electrodes, minimal electrode erosion, minimal gas blanketing of the electrodes, and good separation of electrolysis products. The present invention addresses that need.

The Disk Dynamo.

Michael Faraday discovered in 1831 that by rotating a copper disk through a space between magnetic poles he could draw off an electrical current from the disk near its axis of rotation. This was the first electrical generator. The homopolar generator, as it became known later, was investigated by Tesla and many others. N. Tesla, "Notes on a Unipolar Dynamo," The Electrical Engineer, Sep. 2, 1891. Here, it will be referred to as a disk dynamo. The voltage of the disk dynamo may be small (<3 volts), but the current is large (up to millions of amperes). Current applications include welding and rail guns. The potentials used for electrolytic half reactions are within the range attainable with a disk dynamo.

J. Bockris, et al. *Int. J. Hydrogen Energy*, Vol. 10, p. 179 at 185 (1985) discloses a single disk dynamo rotating through an axial magnetic field. The potential used for water cracking was between the periphery and axis of the same disk.

A charge separation between the disk axis and disk periphery results from the opposite forces on the free positive and negative charges in the disk when the disk rotates through the magnetic field. The motion of the disk is azimuthal and the magnetic, or B field is axial, so the electromotive force (voltage) is radial and opposite for positive and negative charges, causing them to migrate in opposite radial directions. Depending on the direction of rotation and the polarity of the transverse magnetic field, a current flow sets up which may be radially inward, turning the disk periphery into a cathode, or radially outward, turning the disk periphery into an anode.

Carbon Nanotube Synthesis.

Tubular fullerenes, commonly referred to as carbon nanotubes, are a commercially very valuable form of carbon that has many remarkable properties. Carbon nanotubes have 100 times the tensile strength of steel, and may be the strongest material on earth. In their metallic (armchair symmetry) form, they can carry high current with little heat, making them near superconductors. For heat conduction they are the most efficient material known. Each carbon atom connects to three others in a lattice of hexagons rolled into a tube. They have a high degree of resistance to corrosion along their length due to their cohesive molecular structure.

Shortcomings of present carbon nanotube synthesis methods include: amorphous carbon soot and defective structures mixed with the desired structures, small batches, short tube length, kinking, and tangling of produced nanotubes.

Inorganic nanotubes, nanowires, and other fine filamentary structures have also been synthesized. In addition to being made from carbon, nanostructures can also be made from boron nitride, gold, metal dichalcogenides ($MX_2$ (M=Mo, W, Nb, Ta, Hf, Ti, Zr, Re; X=S, Se)), metal oxides, and metal dihalides.

Annealing is recognized to be of benefit in nanotube synthesis Annealing is conventionally understood to be a heat treatment after formation, but mechanical or vibration annealing is also known. The object of annealing is to improve packing of atoms into the desired lattice, to segregate impurities, and to eliminate imperfections in structure. The present invention also improves annealing of nanotubes during synthesis.

A high volume reactor for the continuous synthesis of carbon or other nanotubes is another object of the present invention. If nanotubes could be recovered from $CO_2$ cracking residue, even in low quantities, they might more than offset the expense of reducing carbon dioxide emissions. The incentive to capture and crack carbon dioxide might become profit instead of coercion.

SUMMARY OF THE INVENTION

Conductive disks counter-rotating through a transverse magnetic field become disk dynamos and plates of a dynamic capacitor. The direction of the induced currents in the disks is opposite because of their counter-rotation; one becomes a cathode and the other becomes an anode due to the opposite radial current flow. Between the oppositely charged counter-rotating disks is a workspace where high shear causes a shear layer comprising radial vortices for axially extracting light fraction products of electrolysis, such as syngas, continuously as more feed enters the workspace axially and heavy fraction products of electrolysis, such as carbon nanotubes, exit the workspace peripherally.

Rippled electrode surfaces on the disk dynamos shear gas in the workspace and cause a pulsed electric field as peaks and valleys periodically oppose while the disk dynamos counter-rotate. The radially outward flow of feed in the workspace stalls by turbulence in this high energy environment until it cracks into light fraction and heavy fraction products of electrolysis. Shear assists molecular dissociation by stressing molecular bonds mechanically while the electric field between the shearing impellers stresses the molecular bonds electrically. The electric field fixes and aligns the molecules between the disk impeller/electrodes, and shear tears them apart.

A radial counterflow forcing regime, comprising the centrifugal impellers and an axial suction pump, creates simultaneous source-sink flow in the workspace: sink flow of light fraction products of electrolysis toward the impeller/electrode axis of rotation, and source flow of feed and heavy fraction products away from the axis. Radial counterflow (von Kaman swirling flow in an open system) assures high continuous mass flow through the reactor and long residence time for cracking and centrifugal separation of products. Fine scale vortices in a shear layer between the impeller/electrodes perform centrifugal separation, and larger scale vortices communicating with the fine scale vortices provide radial sink flow conduits for low density light fraction products of electrolysis, such as hydrogen from water or methane.

Momentum transport from the impeller/electrodes advects the feed and heavy fractions radially outward from the axial feed port at the impeller/electrode axis of rotation. Simultaneously, induced vortices in the shear layer centrifugate feed or heavy fraction products away from the vortex axes, out of the shear layer and into laminar outward-flowing boundary layers against the impeller/electrodes. In the boundary layers, the feed and heavy fraction products get a momentum boost. Light fraction products such as syngas, which are displaced away from the boundary layers and concentrate in the shear layer, do not get as much momentum transfer from the impellers. Therefore feed and heavy fraction products, having higher momentum than the light fraction products, are in higher and higher concentration with increasing distance from the axis of rotation of the impellers.

Turbulent impedance of radially-outward-flowing feed fills the boundary layers against the electrodes, stripping away electrolysis products and replenishing feed against the electrodes, thus preventing product gas blanketing of the electrodes. The feed (e.g. $CO_2$ and water) and the heavy fraction products (e.g. ozone and solid carbon) are denser than the light fractions produced by electrolysis (e.g. CO and $H_2$). The low density, low momentum light fraction products of electrolysis are displaced away from the boundary layers by the impeller-centrifugated and shear-centrifugated feed and heavy products. Thus, gaseous electrolysis products are continuously stripped from electrode surfaces, making way for new feed to be electrolyzed at these surfaces. Light fraction products of electrolysis concentrate in the vortex cores of the shear layer, and are advected radially inward to extraction at the impeller/electrode axis of rotation by means of an axial suction pump. These extracted light fraction products can in in turn be the feed flow for another reactor in a cascade, to produce an increasing concentration of the desired output product.

The shear layer of the workspace between the counter-rotating impeller/electrodes contains a radial array of multi-scale vortex trees, which are a network of low pressure gradients converging at the impeller/electrode axis of rotation, where a sink flow is created by the axial suction pump. Each of the fine-scale vortices in the turbulence of the shear layer acts as a centrifugal separator. Light fraction products of electrolysis collected in the vortex cores are extracted through this branched capillary network by the work of the axial suction pump. Fine-scale vortices at the periphery of the workspace roll up carbon into nanotubes, while hydrogen, oxygen, or other gases from cracking the carbonaceous feed are sucked radially inward through the vortex cores and away from the evolving coherent carbon structures.

The vortex-wall interaction also assists in advecting light fraction products of electrolysis radially inward through the radial vortices, which are sink flow conduits. Vortices of the shear layer, upon encountering a pinch at the periphery of the workspace, experience an axial rebound jet through their vortex cores. Because light fractions concentrate at the vortex cores due to their low density, this rebound jet drives light fractions toward the impeller/electrode axis of rotation and squeezes vortices of heavy fraction products of electrolysis, such as carbon, into long, tight tubular structures.

Across the workspace is a potential between the plates of the dynamic capacitor formed by the opposed disk dynamos, which have opposite radial current flow due to their counter-rotation through an axial magnetic field. The plates of this capacitor are the electrodes of the reactor which cracks the carbon dioxide or other feed. Electrode erosion of the plates by concentrated arc discharges is prevented by counter-rotation of the electrodes. Power density never has time to grow to a destructive point at electrode surfaces because incipient arcs are continually disrupted by electrode counter-rotation mechanically separating the arc ends and shearing the feed that sustains the arc. So instead of a few high current wasteful and erosive arcs, there are innumerable small, transient, filamentary discharges transferring electrical energy into the feed to cause molecular dissociation by resistive dissipation of the electrical energy.

Discharges through evolving conductive tubular structures of heavy fraction electrolysis products knit them together and turn them into cathodes pointing into the feed and attracting more carbon ions to their evolving ends Less conductive carbon structures, such as soot, are vaporized and recycled by the current due to their greater resistance, and therefore do not clutter production of high quality metallic nanotubes.

Electrode erosion by falling ions is prevented by spinning the electrodes so that the falling ions chase a moving target and their trajectory becomes tangential to the electrode. The high turbulence of the gas in the shear layer between the electrodes destroys any incipient current path between the electrodes, and acts as a dynamic dielectric.

Because of the protection of the dynamic dielectric and the rotation of the electrodes, carbon does not deposit on the electrodes and catalyst coking is prevented. Carbon ions and carbon particles rotate in self-tightening coherent radial vortices in the shear layer. Rotation of the carbon ion vortex causes a solenoidal magnetic field through which carbon ions rotate. A positive feedback loop ensues, where the magnetic force from ion rotation squeezes ions into the vortex core, thereby accelerating the vortex and causing more magnetic force. Carbon nanotubes form in the shear layer as self-tightening carbon ion cyclones knit into coherent structures under the radial compressive force. Vortex rotation through the magnetic field due to the disk dynamos anneals the nanotubes by magnetomechanical vibration at the same time as they self-tighten in their solenoidal magnetic field. Gas cracking is also assisted by this magneto-mechanical vibration.

Ozone in proximity to the evolved nanotubes at the periphery serves to oxidize imperfections in carbon structures and to functionalize the nanotubes by creating oxygenized sites where other molecules can be attached at a later time.

By means of the present invention, carbon dioxide, which is presently worse than worthless, becomes a valuable resource. Emitters of carbon dioxide have a way to avoid the problems of sequestration, and a profit motive to prevent global climate change.

BRIEF DESCRIPTION OF THE DRAWINGS

FIG. 1 and FIG. 2 show approximately half of the reactor. The illustrative application discussed is the cracking of carbon dioxide and water to produce syngas as well as ozone and carbon.

FIG. 9 shows impeller vanes on the impeller/electrode/electrodes intersecting during counter-rotation.

FIG. 10 shows a detail of the baffle assembly.

FIG. 11a shows a carbon ion vortex, and its intrinsic magnetic field.

FIG. 11b shows the radially inward magnetic force on a carbon ion rotating through the vortex magnetic field.

FIG. 12 shows a detail of a portion of the workspace and an evolving carbon nanotube therein.

FIG. 17 shows a detail of a substrate bombarded by nanostructures ejected from the periphery by the radial railgun effect.

DRAWING REFERENCE NUMERALS

1—feed source
2—axial feed conduit
2a—axial feed port
3—bottom impeller/electrode
4—top impeller/electrode
5—baffle
6—vane
7—pinch section of workspace
8—magnet
9—axial exhaust conduit 9a—axial exhaust port
10—axial suction pump
11—syngas receptacle
12—steam condenser chilled screen assembly
13—insulating seal
14—drive flange
15—drive wheel
16—drive spindle
17—dielectric
18—contact
19—conductive portion
20—substrate

DETAILED DESCRIPTION

By the term "electrolysis" is meant processes which cause molecular dissociation by electrical energy, including processes where dissociation occurs at electrode surfaces as well as processes where molecular dissociation occurs in the bulk fluid (gas, liquid, or combination thereof) between oppositely charged electrodes, including pulsed electric field processes and capacitively coupled plasma processes.

Figure 1:
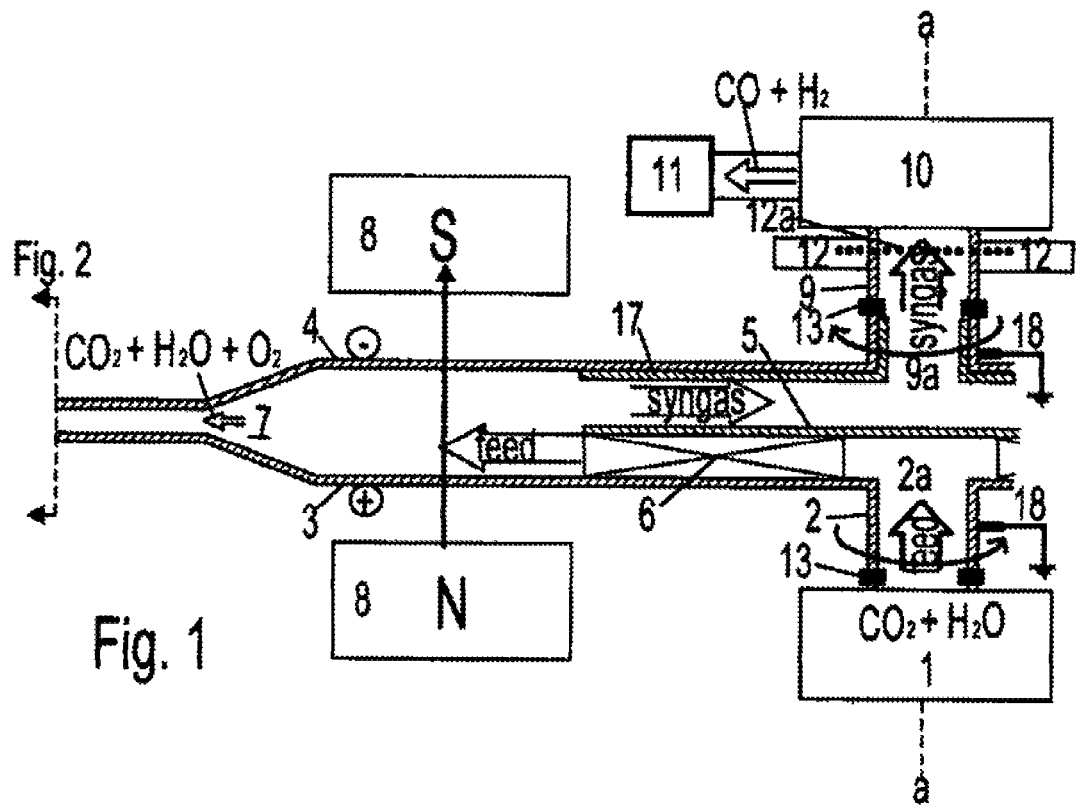
FIG. 1 shows a cross-sectional schematic view of approximately half of the axial portion of the reactor.
Figure 2:
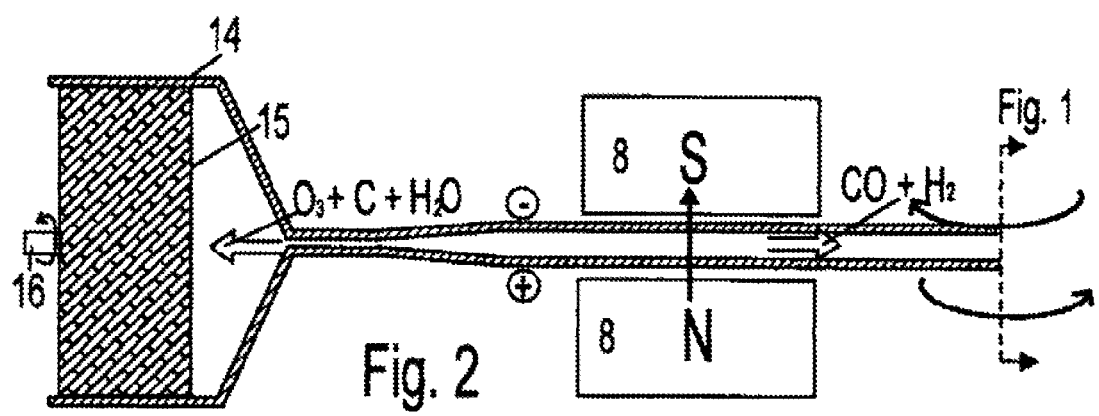
FIG. 2 shows a cross-sectional schematic view of approximately half of the peripheral portion of the reactor, connecting with FIG. 1 as shown by the arrows. Together.

FIG. 1 and FIG. 2 together show a schematic cross-sectional view of the preferred embodiment for simultaneous electrolysis of carbon dioxide and water to produce syngas. FIG. 1 connects to FIG. 2 to show approximately one half of the reactor according to the present invention. The remainder is symmetrical to what is shown.

Another application of the present invention according to the preferred embodiment is to crack carbon dioxide or other carbonaceous feed gas including methane and other alkanes, to synthesize carbon nanotubes. The flow paths for the various fractions are shown by arrows.

Another application is to crack gaseous pollutants such as hydrogen sulfide ($H_2S$), ammonia ($NH_3$), mercaptans, chlorofluorocarbons (CFCs), and volatile organic compounds (VOCs) to render them harmless while recovering valuable materials. Even hot and dirty waste gas streams could be feed to the reactor. For example, flue gas from coal-fired power plants could be directly injected without scrubbing, with light fractions such as nitrogen ballast and water vapor axially extracted along with the light fraction products of electrolysis of the pollutants.

The syngas application will be discussed below as an illustrative example of the operation of the reactor. The description of this example, however, should not be read as a limitation on the application of the reactor to other electrolysis or plasma assisted reactor tasks, such as, for example, the electrolysis of water to produce hydrogen and oxygen. All of said other applications are intended to be covered by the claims. Given the disclosure of the present invention, a person of ordinary skill in those arts will be able to adapt the reactor to the task by calculation and experimentation.

A feed, which for syngas synthesis comprises a mixture of carbon dioxide and water, flows from a feed source 1 through an axial feed conduit 2 which communicates with a workspace defined by and between impeller/electrodes 3, 4 which are straddled by a magnet 8.

The impeller/electrodes rotate about the axis a-a and through the axial magnetic field B between the North and South poles of the magnet 8. Shown here is one magnet 8 causing an axial magnetic field through both impellers. Alternatively, separate magnets could straddle separate impeller/electrodes. The bottom impeller shown here comprises an axial feed port 2a at its center. The impeller/electrodes comprise conductive material, such as aluminum, in their portions between the poles of the magnet 8 and are preferably coated with a catalyst, such as nickel, on their surfaces facing the workspace.

Suitable means cause the impeller/electrodes 3,4 to counter-rotate about the axis a-a. Preferred means for causing counter-rotation of the impeller/electrodes 3,4 are peripheral drive wheels 15 as shown with more particularity in FIG. 2 and FIG. 3. The drive wheels 15 engage drive flanges 14 on each impeller/electrode and are driven by drive means (not shown) such as electric motors connected to the drive wheels by drive spindles 16. The drive wheels 15 are preferably pneumatic tires, or alternatively geared wheels engaging cogs on the flanges. The drive wheels maintain separation of the impeller/electrodes at the desired distance and also transfer energy from the drive means to the impeller/electrodes. Other suitable means could be used, such as belt drives connecting a motor to the impeller/electrodes.

The counter-rotating impeller/electrodes 3,4 act as centrifugal impellers to the feed coming through the axial feed port 2a, advecting feed radially outward from the axis of rotation a-a toward the periphery of the workspace and also drawing feed from the source 1 through the axial feed conduit 2. The feed flow rate can be assisted by a feed pump, not shown, or by the pressure of a feed produced by combustion. Momentum transport from the impeller/electrodes to the feed creates a boundary layer against each impeller/electrode and a shear layer between the boundary layers. Within the shear layer is a fractal tree network of radial vortices.

An axial suction pump 10 draws fluid radially inward to the axis a-a through the radial vortex cores of the shear layer in the workspace between the impeller/electrodes and out of the workspace through an axial exhaust conduit 9 communicating with an axial exhaust port 9a approximately at the center of the top impeller. In the present example, this axially extracted fluid is the light fraction products of simultaneous electrolysis of carbon dioxide and water, viz. carbon monoxide and hydrogen, a mixture known as syngas. Syngas extracted from the workspace is collected in a syngas receptacle 11. The syngas can be used as fuel directly or converted into other products such as liquid vehicle fuel. For water electrolysis, the light fraction product would be hydrogen. For methane cracking, the light fraction product would be hydrogen.

Across the axial exhaust conduit 9 is a chilled screen 12a for causing condensation of entrained water vapor. The chilled screen is kept chilled by a chilling reservoir 12 containing fluid and communicating with chilling means (not shown). Condensate dripping from the chilling screen drops back onto a baffle 5 and the baffle in rotation advects condensate radially outward from the axis a-a back into the workspace.

The impeller/electrodes 3,4 preferably converge to a pinch section 7. At the pinch section, and at all locations of the workspace where the impeller/electrodes converge further, an axial jet through vortex cores toward the axis a-a is caused by a phenomenon known as the vortex-wall interaction. See FIG. 6.

A baffle 5 disposed in the workspace serves to separate the axial feed port 2a from the axial exhaust port 9a so the feed does not go directly out the axial exhaust port but is directed radially outward from the axial feed port. The baffle is preferably of dielectric material. Shown here is a baffle connected by vanes 6 to the bottom impeller/electrode 3. Alternatively the baffle could be a static structure disposed between the axial feed port and the axial exhaust port, connected to the axial feed conduit and the axial exhaust conduit by suitable means and comprising flow channeling means such as radial nozzles for improving the extraction of light fraction electrolysis products such as syngas from the vortex cores. The connecting vanes 6 serve to advect the feed radially outward from the axis a-a when the bottom impeller/electrode 3 rotates. The baffle, vanes, and the bottom impeller/electrode constitute a centrifugal pump for the feed. A detail of the rotatable vanes and baffle assembly is shown in FIG. 10.

At least one magnet 8 is disposed such that its poles straddle the counter-rotating impeller/electrodes 3,4 at said conductive portions. Shown here are two annular magnets having polarity as indicated and an axial magnetic field B between the poles. Preferably each of the magnets 8 is an electromagnet comprising means for controlling the current (not shown) so as to adjust the strength of the magnetic field B. The lines of the magnetic field B intersect opposed conductive portions of the impeller/electrodes as they counter-rotate about the axis a-a, and through said conductive portions current flow is radially opposite for each impeller/electrode.

Alternatively the magnet 8 could be coils about the axial feed conduit and the axial exhaust conduit, with a B field between the coils. In that alternative embodiment, a conductive portion of the impeller/electrodes is near their axis of rotation and rotates through said B field.

Due to counter-rotation of the approximately parallel disks 3,4 through the B field between the poles of the magnet 8, the disks become disk dynamos (also sometimes referred to as homopolar generators, unipolar generators, or Faraday disks). Each disk is an armature of a generator as well as a plate of a capacitor. The top impeller/electrode 4 becomes a cathode, having (conventional) current flow radially inward (and electron flow radially outward), and the bottom impeller/electrode 3 becomes an anode, having current flow radially outward (and electron flow radially inward).

Oppositely charged electrodes facing each other across the workspace are caused by said opposite current flow. Disk counter-rotation creates a dynamic capacitor having as its dielectric the gas in the workspace and as its plates the armatures of the disk dynamos. Turbulence in a shear layer between the plates prevents arcing between the impeller/electrodes 3,4 by denying a stable path for current flow through the gas. Electrolysis occurs in redox reactions at the electrodes and in the bulk by electrical energy into the sheared feed. Products of said electrolysis include light fractions and heavy fractions. Light fractions have a density (molar mass) less than the feed, and heavy fractions have a density greater than the light fractions. For example, hydrogen from methane cracking has a molar mass of 2 g/mol, whereas the methane feed is 16 g/mol, and carbon ions are 12 g/mol. While the feed cracks in high turbulence during its radially outward flow, heavy fraction products of electrolysis are advected radially outward from the axis a-a through the periphery of the workspace and light fraction products are advected radially inward to the axial exhaust port 9a.

When carbon dioxide and water are simultaneously electrolyzed, the light fraction products extracted through the axial exhaust port 9a include hydrogen and carbon monoxide, a mixture known as syngas. Thus carbon dioxide is cracked into a useful product which can be used as fuel. Heavy fraction products include oxygen and elemental carbon. Oxygen can be electrolyzed further into ozone, and carbon in mechanically-forced high shear in the high E field can be synthesized into long nanotubes. The oxygen, ozone, and carbon are extracted from the reactor through the periphery of the workspace.

Nanostructures ejected from the periphery may impact a substrate 20 (not shown here, see FIG. 17 and become embedded therein. The substrate is one of the means for collection of heavy fraction products of electrolysis at the periphery of the workspace between the impeller/electrodes.

At the periphery of the workspace, shown in FIG. 2, there is a strong electric field between the disk dynamos because of large opposite charges on the separated impeller/electrodes 3,4. The strength of the electric field may be adjusted by adjusting the current in the coils of electromagnets 8, the rotation speed of the impeller/electrodes 3, 4, and the spacing between them.

Means for preventing arc discharges are provided at the axial portion of each disk dynamo. Said discharge preventing means include dielectric barriers 17 covering the surfaces of the disks which face the workspace, and contacts 18 engaging the axial portions of the electrodes so as to draw off current from said axial portions and dissipate it through a resistive load or discharge it directly into ground. The location of the contact point of the contact 18 is preferably before the seal 13 so as to prevent damage to the seal 13. Suitable contacts 18 include slidable brushes or other means known to the art of high current DC generators. Said axial discharge preventing means prevent syngas and oxygen from igniting inside the reactor.

A radial railgun effect takes place due to discharges between the impeller/electrodes 3,4 at their periphery, beyond the pinch section 7. Interaction between the discharge magnetic fields and the inter-disk B field (the concentric magnetic field between the impeller/electrodes 3,4 see FIG. 13a) impels ionized gases and entrained evolving solid structures such as solid carbon and carbon nanotubes radially outward away from the axis a-a. A substrate (not shown) disposed across the periphery of the workspace is bombarded and plated by highly energetic spears of nanostructures, due to an effect known from railguns, which will be called here the radial railgun effect. See FIG. 17.

The conventional railgun is a linear propulsion device having conductive parallel rails connected to a power supply in a DC circuit. Connecting the rails is a conductive fuse. A projectile rests ahead of the conductive fuse. When a high current is caused to flow along the rails, the fuse connecting the rails becomes vaporized and ionizes. An arc discharge through the ionized fuse causes a strong magnetic field having magnetic field lines directed the same as the magnetic field lines between the rails, therefore the fuse discharge and its associated ionized gas, along with the projectile, are repelled out along the rails. Acceleration due to the railgun effect can be very high, as much as $10^6$ g, resulting in speeds on the order of kilometers per second.

The present invention can be envisioned as a myriad array of radial railguns wherein the disk impeller/electrodes 3,4 are the rails, the gas in the workspace is the fuse, and the direction of repulsion is radially outward from the axis a-a. Nanotubes, nanowires, and other nanostructures become radially accelerated missiles shooting out of the periphery and embedding themselves in the substrate. Carbon nanotubes embedded in a substrate would make an excellent capacitor plate and an excellent solar energy collector.

Figure 13A:
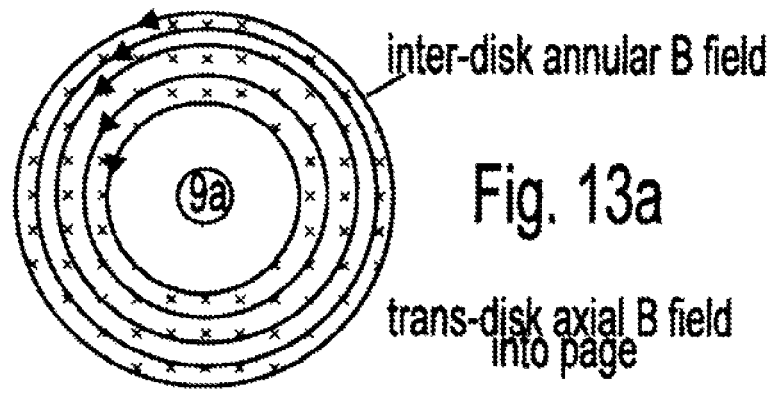
FIG. 13a shows the concentric magnetic field in the workspace between the counter-rotating impeller/electrodes.

Concentric magnetic field lines exist in an annular magnetic field in the workspace, as shown in FIG. 13a, due to the opposite radial current flow in the impeller/electrodes.

Vortices of carbon ions in the workspace have their axes stretched radially outward by the radial ejection of discharges in the radial railgun, and their vorticity is thereby increased. The same is true of carbon vapor. The radial railgun effect assists in the formation of carbon nanotubes because carbon ion vortices in the workspace are self-tightening, i.e. their rotation creates their own solenoidal magnetic field, and rotation through of ions through this field causes a magnetic force which pushes the rotating ions toward the vortex axis, thereby accelerating the vortex and strengthening the solenoidal magnetic field, and so on in a positive feedback loop. See FIGS. 11a and 11b. Self-tightening of carbon ion vortices overcomes electrostatic repulsion of like-charged species and squeezes carbon ion vortices into tubular fullerenes, or carbon nanotubes. Carbon vapor is swept along in the vortices and falls into the cathode tip of the evolving nanotube.

Other nanofibers or nanotubes other than pure carbon could also be synthesized by the radial reactor according to the present invention, using the appropriate feedstock, for example, boron nitride, gold, metal dichalcogenides (MX2 (M=Mo, W, Nb, Ta, Hf, Ti, Zr, Re; X=S, Se)), metal oxides, metal dihalides, and other inorganic nanotubes, nanoscrolls, nanobuds, or nanofibers. Even in amorphous form, solids emitted from the reactor of the present invention, which are ejected from the periphery of the workspace in high radial acceleration by the radial railgun effect, would have very high kinetic energy. This might make them suitable for strongly adherent, thick and tough plating, such as diamond plating, even on non-metallic substrates. Another application is for solar panels, with an embedded fuzz of carbon nanotubes serving to collect solar energy into the substrate.

Insulating seals 13 separate the impeller/electrodes from the static portions of the axial feed conduit 2 and axial exhaust conduit 9. The insulating seals are of dielectric material. A dielectric 17 separates the axial portion of the top electrode 4 and the axial exhaust conduit 9 from the fluid being advected by the axial suction pump 10. The baffle 5 is preferably shielded with a dielectric as well. The purpose of the dielectric 17 is to prevent discharges through syngas as it is being axially extracted through the axial exhaust conduit 9. Contacts 18 sliding on the axial portion of the impeller/electrodes between the workspace and the seals 13, the brushes connected to ground with or without an intermediate resistive load, would discharge the axial disk charges which might cause discharges through the syngas in the workspace.

In the workspace, while the impeller/electrodes 3,4 are in counter-rotation, there are boundary layers against each impeller/electrode where fluid flows radially outward due to viscous diffusion of momentum from the impeller/electrodes. Between the boundary layers is a shear layer, where flow is turbulent. This is von Karman swirling flow (s−1) in an open system, having continuous mass flow in (through the axial feed port 2a) and out (through the axial exhaust port 9a and also out through the periphery of the workspace). Note that this is different from the closed systems (no mass flow in or out) such as the magnetohydrodynamic setups often studied in connection with von Karman swirling flow.

Turbulent drag impedes radially outward flow through the shear layer, forcing incoming feed around the shear layer and against the electrodes where redox reactions occur. Although the voltage between the periphery and axis of a single disk dynamo may be small (under 3 volts) this small voltage is more than adequate for redox reactions at the surfaces of the impeller/electrodes 3, 4. The current in each disk dynamo of the dynamic capacitor is very large, so large opposite charges straddle the workspace. Charge separation is the distance between the surfaces of the impeller/electrodes and not the radius of the disk dynamo. Charge separation can be varied by changing the diameter of the peripheral drive wheels. The peripheral drive wheels also prevent the impeller/electrodes from coming together due to the attraction of their large opposite charges.

Figure 4:
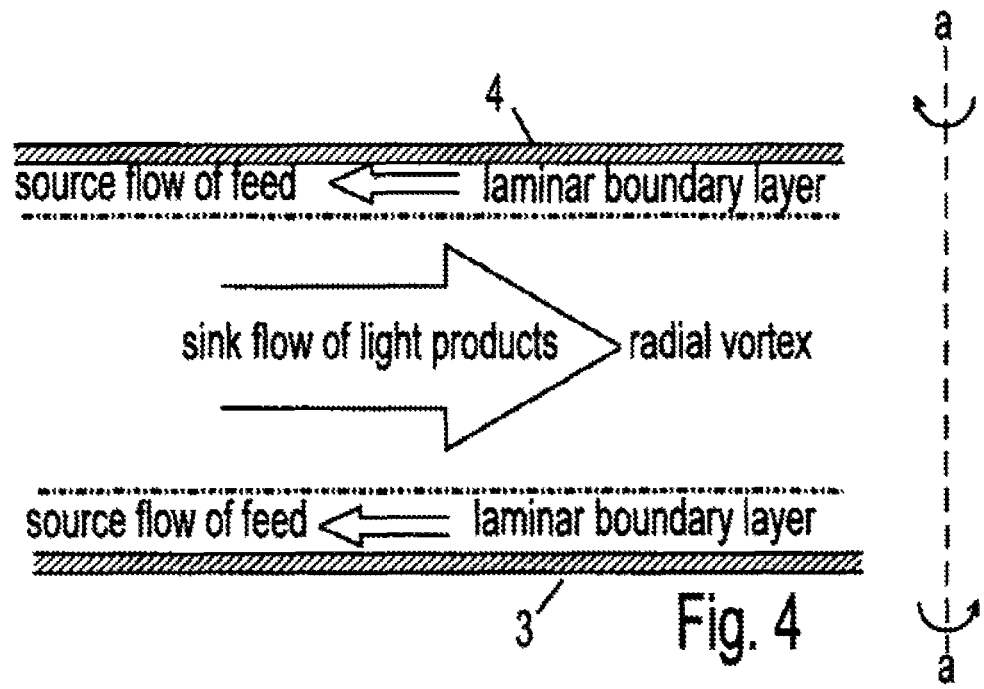
FIG. 4 shows a detailed side view of radial counterflow through the workspace.
Figure 5:
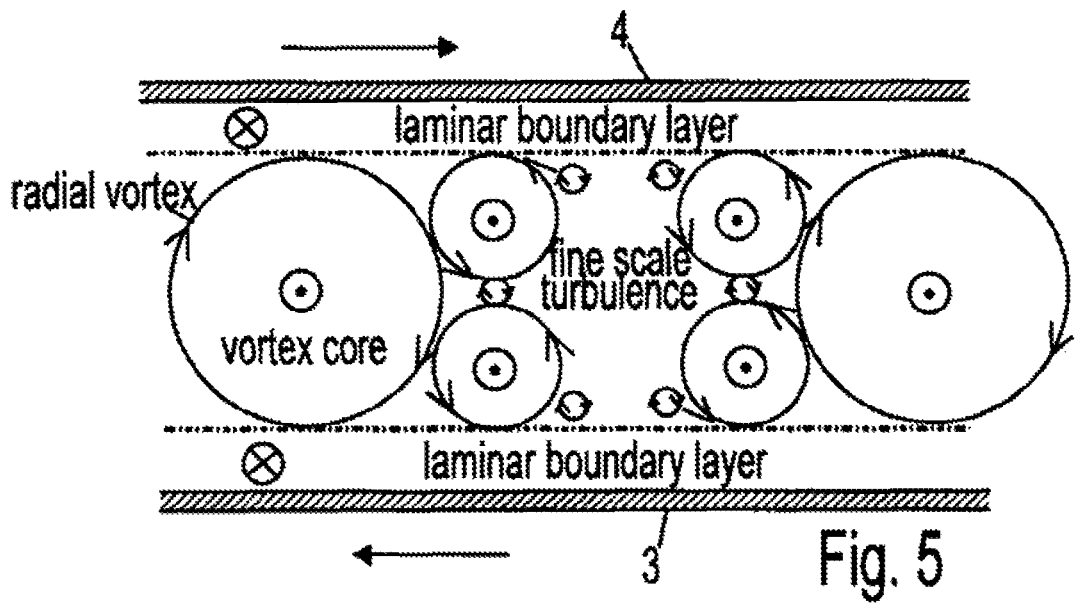
FIG. 5 shows a view into the radial vortex cores.
Figure 7:
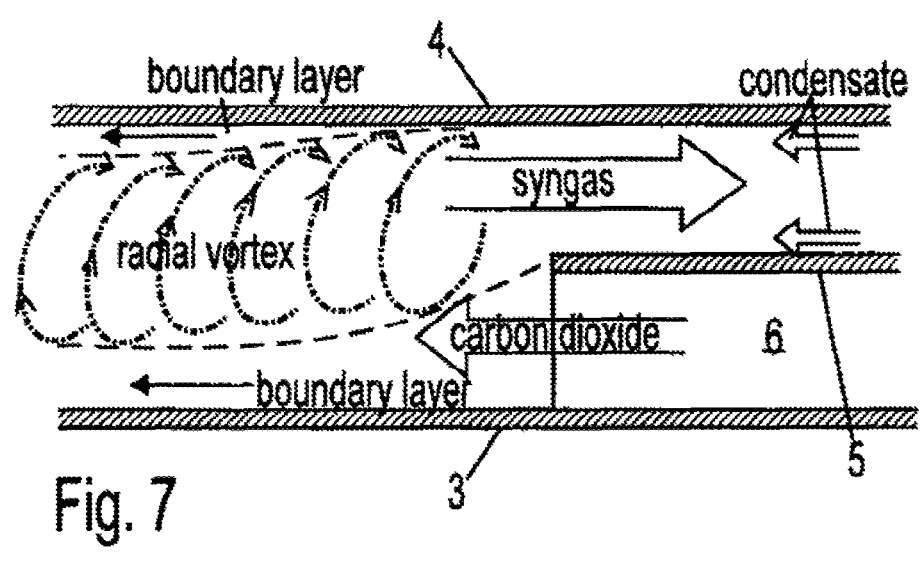
FIG. 7 shows a detail of radial counterflow at the feed inlet.

High shear between the impeller/electrodes 3,4 prevents arc discharges across the workspace and causes anisotropic turbulence. Large scale vortices in the shear layer of the workspace bifurcate into a fractal branching network, an array of vortex trees radiating from the axis a-a. Each radial tree vortex is a network of low pressure gradients which are sink flow conduits linking capillary fine structures to coherent large scale structures. The axial suction pump 10 draws the light fraction products of electrolysis in these vortex cores radially inward to the axis a-a while simultaneously the heavy fraction products of electrolysis are advected radially outward in the boundary layers against the impellers, around the shear layer. The impeller/electrodes 3,4 in combination with the axial suction pump 10 constitute a radial counterflow forcing regime which is driven by mechanical energy. A detail of the radial counterflow is shown in FIG. 4, FIG. 5, and FIG. 7.

Figure 6:
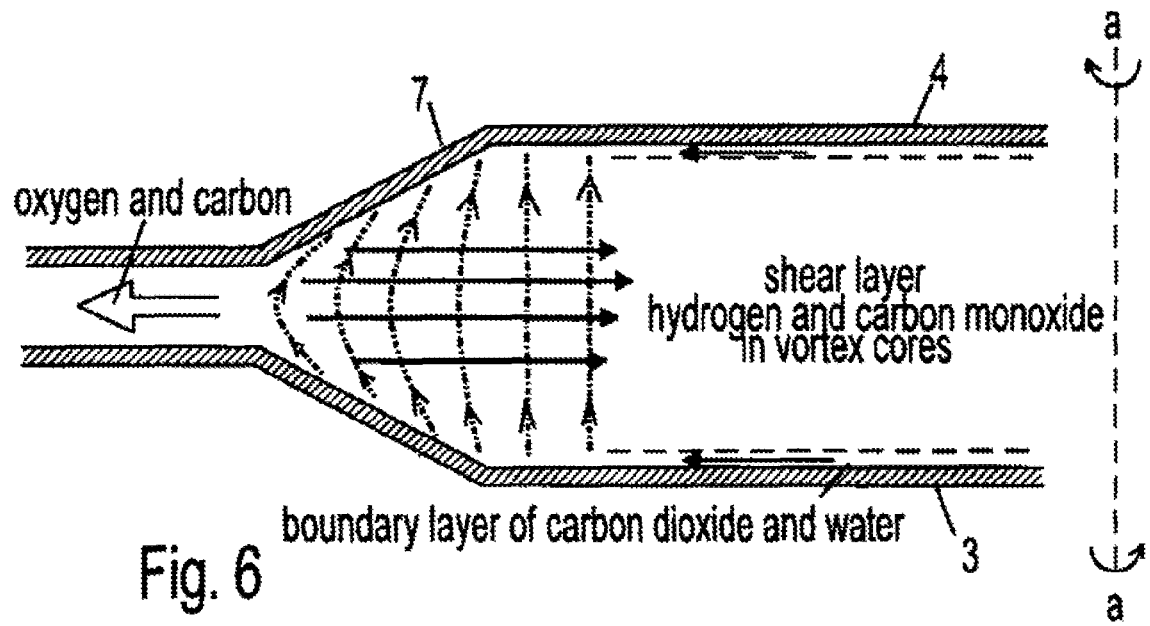
FIG. 6 shows a detail of the pinch section of the workspace, and the vortex-wall interaction.

Additionally, a phenomenon known as the vortex-wall interaction squeezes sink flow radially inward to the axis a-a through the vortex cores of the shear layer. A detail of the vortex-wall interaction is shown in FIG. 6. At the pinch section 7 of the workspace, where the impeller/electrodes 3,4 converge and become more closely separated, vortices encountering the pinch 7 drive an axial rebound jet through the vortex core radially inward to the axis a-a away from the pinch section 7. Fine-scale vortices in this region of the workspace are thereby milked of their light fraction products, such as carbon monoxide (molar mass 28 g/mol) and hydrogen (2 g/mol). Heavy fraction products such as oxygen (32 g/mol), ozone (48 g/mol), solid carbon and liquid water are spun out of the shear layer due to their high density.

In summary, due to density differences in the organized turbulence of the workspace, there is a continuous migration of feed and of heavy fraction products of electrolysis radially outward and of light fraction products of electrolysis radially inward, with respect to the impeller/electrode axis of rotation a-a. The radial counterflow forcing regime and the radial vortices of the shear layer provide means for continuous axial extraction of light fraction products of electrolysis as feed flows in continuously at the axis a-a and heavy fraction products of electrolysis flow out of the periphery.

Figure 8A:
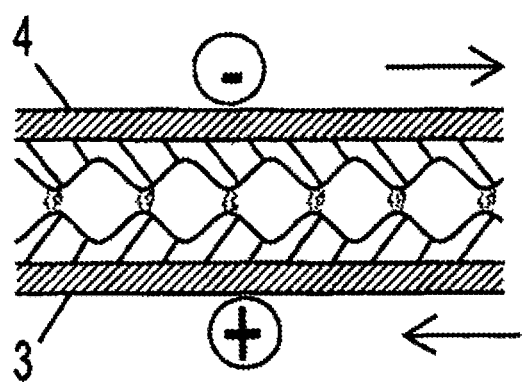
FIG. 8a and FIG. 8b show rippled electrodes during counter-rotation producing a pulsed electric field.
Figure 8B:
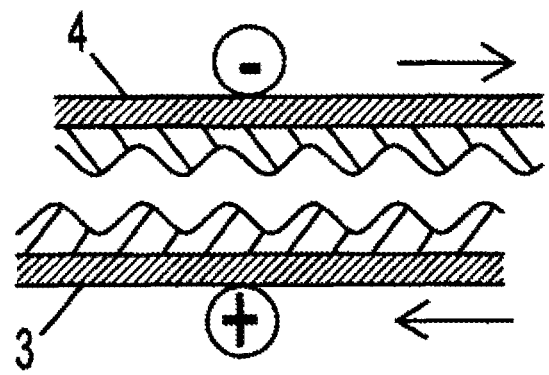

Radially outward from the pinch section 7 is a peripheral annulus where the counter-rotating impeller/electrodes are close together. Preferably, the electrodes comprise radial ripples, as shown in FIGS. 8a and 8b. The periodic opposition of peaks of the ripples causes a pulsed electric field in the workspace. The frequency depends on rotation speed of the impeller/electrodes and the number of peaks on each. For impeller/electrodes having 1000 peaks, each rotating at 2 revolutions per second, the frequency of the pulsed electric field between them would be 4 kHz. Capacitive coupling of electrical energy into the gas in the workspace assists in cracking carbon dioxide and water so as to produce syngas and also assists in the formation of ozone and nanotubes.

Alternatively, the electrodes comprise oppositely curved vanes 6 instead of or in addition to radial ripples. This is shown in FIG. 9. In counter-rotation, the impeller/electrodes 3,4 cause numerous points of intersection where the vanes approach close enough to cause discharges between them, said points of intersection moving radially outward from the axis a-a as the counter-rotation continues. The opposed vane embodiment is a glidarc reactor having the advantage of long residence time because feed flow through the electrodes is turbulently impeded at the pinch section 7 while the arcs at points of intersection repeatedly lash through it.

A radially directed potential exists between the peripheral annulus of the workspace, where between the closely spaced highly charged impeller/electrodes there is an abundance of free electrons, and the axial portion of the workspace where incoming feed offers a ground. The path for electrons radially inward through the workspace is along any conductive carbon structures, turning them into cathodes which electrolyze feed in the vicinity of the structure tip pointing into the feed. Tiny cathodes accrete carbon atoms at their cathode tips to build into tubular fullerenes, or carbon nanotubes. A detail of this is shown in FIG. 12.

As shown in FIG. 13a, between the disk armatures (impeller/electrodes 3,4) is a magnetic field having concentric field lines in the direction of the rotation of the top disk 4 (cathode at periphery, anode at axis, so conventional current, which is the opposite of electron flow, is radially inward in the disk dynamo). Charged species vibrate as they pass through the inter-disk magnetic field while they rotate in vortices. This is magnetomechanical vibration, shown with more particularity in FIG. 14. On the downstroke of each revolution of the vortex, positive ions such as carbon receive impulses radially inward toward the axis a-a, and negative ions radially outward.

Magnetomechanical vibration in the turbulent vortices transfers kinetic energy into molecules and thereby assists in dissociation. Carbon atoms rotating in carbon dioxide through this concentric magnetic field are pulled radially inward toward the axis a-a while the oxygen atoms are pulled radially outward. On the upstroke, the directions are reversed. Each vortex revolution is one stress cycle on the molecular bonds, which flex at that frequency until they break.

Magnetomechanical annealing of evolving carbon nanotubes occurs in the same manner as the carbon ion vortices rotate through the concentric magnetic field between the disk dynamos. High frequency magnetomechanical annealing improves packing and reduces imperfections.

Some of the cracked carbon dioxide is axially extracted by means of the radial vortices as carbon monoxide. The remainder of the carbon dioxide, plus some carbon monoxide, continues to flow radially outward past the pinch section 7 along with oxygen. Further dissociation of carbon compounds strips off the second oxygen atom, leaving bare carbon ions. The carbon ions revolve in vortices due to the shear between the impeller/electrodes 3,4.

The vortex of carbon ions causes a solenoidal magnetic field, as shown in FIG. 11a. The carbon ions rotating through their own magnetic field experience a magnetic force, as shown in FIG. 11b, having a direction radially inward toward the vortex axis. The radially inward force increases rotation speed, which increases the magnetic field and the magnetic force, and so on, in a positive feedback loop.

Self-tightening carbon ion tornadoes overcome electrostatic repulsion of like-charged carbon ions to pack into carbon nanotubes. Electrons from the plasma in which these carbon ions reside flow through the evolving carbon ion vortices away from the high electron plasma region at the periphery and toward the axis a-a. Each evolving carbon structure becomes a cathode tip dangling in the workspace and reducing carbon dioxide and carbon monoxide in its vicinity. Carbon atoms aggregate to each cathode tip, evolving a multitude of carbon nanotubes continuously as the solidified ends of the nanotubes are extruded through the periphery and gathered by suitable means (not shown) known to the art of fiber synthesis. The solenoidal magnetic fields of the carbon ion tornadoes have the same polarity because the tornadoes co-rotate, so the vortices of evolving nanotubes are kept separate. Parallel nanotubes, rather than tangled bundles, are produced.

Current passing through evolving carbon structures vaporizes soot and semiconductive structures by resistive heating. Metallic (armchair symmetry) carbon nanotubes suffer little resistive heating because they are excellent conductors. The vaporized carbon structures are then recycled into metallic nanotubes. Thus a high proportion of desired, highly conductive carbon nanotubes is obtained free of the clutter of soot and defective structures. Carbon nanotubes which successfully pass through the workspace without becoming vaporized extrude from the periphery of the workspace, as shown in FIG. 12.

Oxygen passing radially outward through the plasma in the workspace becomes ozone (48 g/mol), another dense fraction which is extruded along with the nanotubes. Ozone oxidizes amorphous carbon and defective structures, but properly formed nanotubes resist oxidation because of the very strong bonds between carbon atoms. Ends of broken nanotubes are oxidized by the ozone in what is called functionalization. Functionalized sites may be used later for attaching other atoms to the nanotube, or for linking nanotubes together into a fabric or strong cable.

Figure 3:
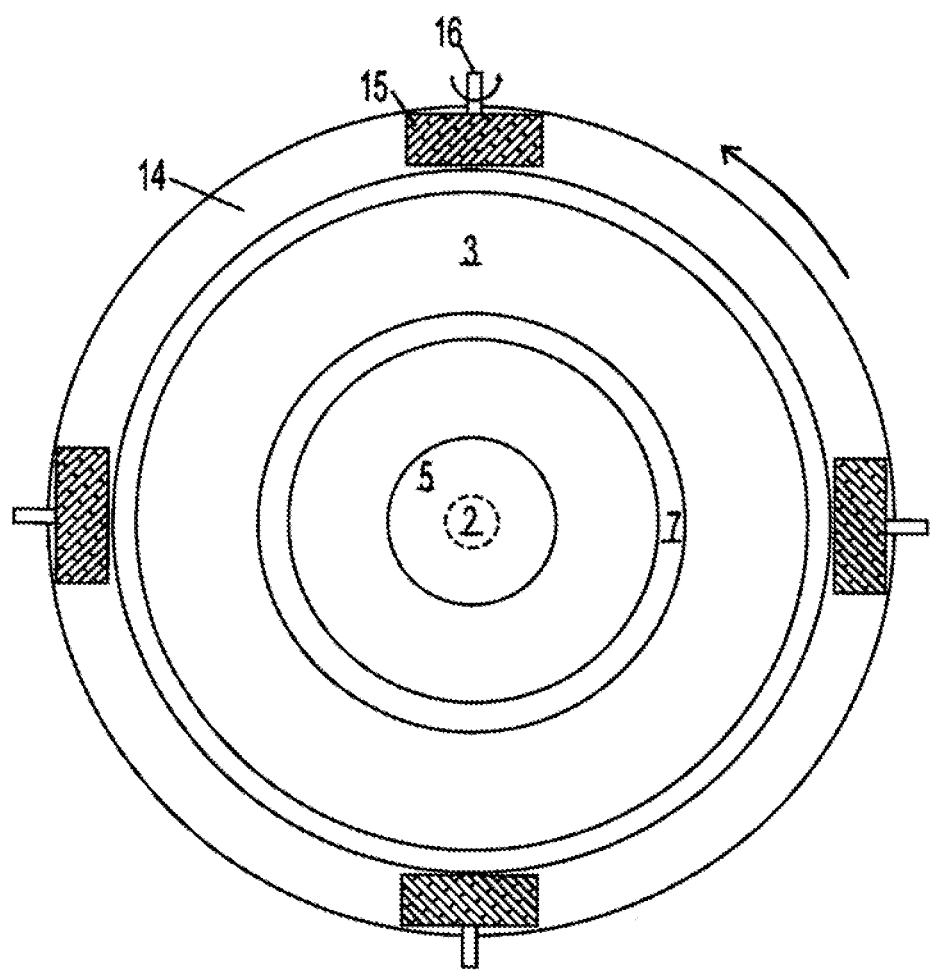
FIG. 3 shows a top view of the workspace with the top impeller/electrode removed, showing a plurality of drive wheels for counter-rotation of the impeller/electrodes.

FIG. 3 shows a top view of the bottom impeller/electrode 3. Shown are four drive wheels 15 driven by drive spindles 16. The drive wheels engage a drive flange 14 on the bottom impeller 3, causing the bottom impeller to rotate as shown by the arrow. More or fewer drive wheels could be used. The top impeller 4 (not shown) engages the drive wheels at its drive flange and is rotated in an opposite direction from the bottom impeller 3 by the rotation of the drive wheels 15. The peripheral drive means shown in FIG. 3 allows for nearly exact counter-rotation of the impeller/electrodes 3,4 and for high torque to get them started in rotation. The drive wheels also maintain separation between closely spaced highly charged electrodes and prevents the attraction of opposite charges from bringing the electrodes together. More or fewer drive wheels than four could be used.

FIG. 4 is a detailed side view of a portion of the workspace while the impeller/electrodes 3,4 are counter-rotating about the axis a-a. Radial counterflow is shown. A sink flow of light fraction products of electrolysis, such as carbon monoxide and hydrogen (syngas), and a simultaneous source flow of feed and heavy fraction products (such as oxygen and elemental carbon), occur in the workspace. The sink flow is through cores of radial vortices in von Karman swirling flow in an open system. The von Karman swirling flow is caused by a radial counterflow forcing regime comprising the simultaneous suction of an axial pump and centrifugal pumping of the counter-rotating impeller/electrodes. The source flow is along the impeller/electrodes 3,4 in laminar boundary layers around the shear layer between the impeller/electrodes, which contains the sink flow conduits.

FIG. 5 shows another detail of a portion of the workspace, this time viewed from the axis a-a. Fluid flow direction is shown by the convention of magnetic fields: crosses for flow away, and dots for flow toward the observer. Flow toward the axis a-a, or sink flow, is caused by the work of the axial suction pump 10 shown in FIG. 1 and by the vortex-wall interaction shown in FIG. 6. Flow away from the axis a-a is caused by the advection due to momentum transfer in the boundary layer from the impeller/electrodes 3,4 which counter-rotate as shown by the arrows. Between laminar boundary layers is a shear layer comprising coherent radial vortices for sink flow. Numerous vortices of many scales are in the shear layer. All vortex cores, whatever the direction of rotation of the vortex, point toward the axis a-a.

The shear layer is permeable to sink flow of light fraction products in the vortex cores. Sink flow is forced by the work of the axial suction pump 10 shown in FIG. 1. In the vortex cores, due to centrifugal vortex separation, fractions having low molar mass, such as hydrogen (2 g/mol) and carbon monoxide (28 g/mol) are in high concentration, and heavy fractions such as carbon dioxide (44 g/mol) are in low concentration. Low molar mass fractions have low density and separate centrifugally in vortex rotation. Therefore a flow rich in syngas will be axially extracted by the axial pump.

In the laminar boundary layers, the light fractions are in low concentration and the heavy fractions are in high concentration, due to said centrifugal vortex separation and the obstacle presented to incoming feed by the turbulent drag in the shear layer. Momentum transfer from the impeller/electrodes will therefore primarily go to the heavy fractions and feed, leaving the light fractions lagging in radially outward flow (source flow) from the axis a-a. Radially inward from the axis a-a the light fraction products of electrolysis are in high concentration, and radially outward from the axis a-a the heavy fraction products of electrolysis are in high concentration. Feed is held up between the heavy and light fraction concentrations until it is cracked. Long residence time of feed in the processing zone between the impeller/electrodes is caused by the turbulent drag of the shear layer and by the vortex-wall interaction at the pinch 10 section 7, shown in FIG. 6. Long residence time of feed and efficient extraction of electrolysis products in this reactor is a significant step forward over prior art devices such as the glidarc or Glidarc II reactors.

FIG. 6 shows a detail illustrating the vortex-wall interaction at the pinch section 7 of the workspace, where the impeller/electrodes 3,4 converge to close separation. See V. Shtern, et al., Ann. Rev. Fluid Mech. 1999, 31:537-66. A radial vortex, which is forced by counter-rotation of the impeller/electrodes 3,4 and the suction of the axial pump 10 approaches the pinch section 7 in radially outward flow from the axis a-a. Curved dotted streamlines show vortex rotation. The outward-bound vortex encounters an obstacle, and vortex rotation suddenly stalls, which causes an axial rebound jet, shown by the straight solid streamlines. The axial rebound jet is in the opposite direction to the incoming vortex, i.e. toward the axis a-a instead of radially outward from it. The axial rebound jet has high axial vorticity and high axial momentum. "Swirl induces a pressure drop toward the axis, thus attracting other streamlines to the axis; this further focuses the swirl, thereby further decreasing the pressure in the core. This positive feedback leads to the strong accumulation of axial vorticity and momentum, i.e. to the formation of the vortex core." Id. at p. 551. The vortex cores contain syngas, which is advected toward the axis a-a by the work of the axial suction pump 10 (not shown) and the impulse of the vortex-wall interaction.

Alternately, the pinch section can be made of a dielectric material, thereby dividing the impeller/electrodes into two or more annular concentric sections, each concentric section being charged by its own magnet, and having its own grounding means. In this way, the discharge characteristics of the inner and outer sections of the workspace can be varied independently as needed.

Beyond the pinch section 7, where the impeller/electrodes converge even closer, the high axial voracity due to the vortex-wall interaction self-tightens carbon ion tornadoes into nanotubes, as discussed under FIGS. 11a, 11b, and 12. High axial momentum towards the axis of rotation a-a prevents carbon vortices from being swept out of the workspace and keeps cathode tips dangling in the workspace to evolve nanotubes. Thus the vortex-wall interaction assists in the formation of carbon nanotubes.

Oxygen from electrolysis flows radially outward past the pinch section 7, as shown by the arrow. Some oxygen may become axially extracted along with syngas, which makes anti-arcing measures at the workspace axial region particularly important. Oxygen may become ozone by electrolysis in its passage to the periphery of the workspace. Unreacted oxygen recycles back because of its lower density, while ozone is recovered at the periphery.

FIG. 7 shows a radial vortex in the vicinity of the incoming feed. Syngas at the vortex core is advected radially inward toward the axis a-a by the work of the axial suction pump 10 (not shown). Carbon dioxide is advected radially outward simultaneously by the work of the bottom impeller/electrode 3 and its attached vanes 6 and baffle 5 which constitute a centrifugal pump. A boundary layer of carbon dioxide forms against the impeller electrodes 3,4 because carbon dioxide is denser than syngas and is therefore rejected from the radial vortex cores. Condensate is also rejected into the boundary layers.

FIGS. 8a and 8b show a detail of a portion of the workspace between the impeller/electrodes 3,4, whose rotations are shown by arrows. Rippled cross-sections are shown for both impeller/electrodes. In FIG. 8a, peaks oppose peaks, causing discharges between the peaks. In FIG. 8b, which is a fraction of a second later, the peaks oppose valleys, and the discharges extinguish. A pulsed electric field transfers electrical energy into the gas between the impeller/electrodes, and the discharges pulse current into evolving carbon nanotubes so as to make them into cathodes pointing into the feed. Preferably, the peaks are formed of dielectric 18, to prevent erosion of the electrodes by the arcs between them.

FIG. 9 shows an alternative embodiment having intersecting curved vanes instead of opposing ripples. Shown is a top view of a portion of the bottom impeller/electrode 3. Curved vanes 6 on the bottom impeller/electrode 3 are shown in solid lines. The position of oppositely curved vanes on the top impeller/electrode 4 is shown by dashed lines. Direction of rotation is shown by the arrows. Points of intersection exist between the superposed vanes of top and bottom impeller/electrodes, and these points of intersection move radially outward as the impeller/electrodes counter-rotate. At the points of intersection is a high electric field across the workspace. Any arcs caused by this high E field glide rapidly radially outward from the axis a-a due to counter-rotation of the vanes to which the arc is connected. Therefore the arc does not dwell on the vanes, and erosion is prevented. In contrast to conventional gliding arc reactors, the residence time of feed between the electrodes is long, for good cracking efficiency, because arc gliding does not depend on gas flow.

FIG. 10 shows a bottom view of the baffle 5 and the vanes 6. The baffle 5 can be attached by the vanes 6 to the bottom impeller/electrode 3 (not shown). Rotation as shown by the arrow advects feed from the axial feed conduit 2 radially outward into the workspace as a source flow. The baffle and vanes form part of a centrifugal pump.

FIG. 11a shows a solenoidal vortex of carbon ions. The vortex is forced by the radial 10 counterflow forcing regime described above. The vortex rotates as shown by the arrows, and the motion of positive charges, i.e. the carbon ions, in the vortex causes a solenoidal magnetic field, whose North and South poles are indicated by N and S respectively. Carbon ions distal from the vortex core are shown being attracted by magnetic force $F_B$ as they rotate in the vortex.

FIG. 11b shows a carbon ion in the vortex and magnetic field shown in FIG. 11a. The carbon ion rotates in the vortex with velocity v through a magnetic field B and thereby experiences a magnetic force $F_B$ which is orthogonal to the other two vectors. The direction of the magnetic force is radially inward to the vortex axis. Increased velocity increases the solenoidal B field and thereby increases the magnetic force, which increases velocity even further, etcetera. This is the self-tightening of tubular carbon ion structures in vortex flow. In contrast to conventional means for causing carbon ion vortices, which rely on feed pressure, the present invention forces vortices by high shear in mechanical means. Vortex axis orientation is highly directed and parallel rather than randomly directed and tangled.

FIG. 12 shows a detail of an evolving carbon nanotube being extruded to the left through the periphery of the workspace in a region where plasma and discharges through the plasma are present. Radial counterflow of feed and syngas is shown by the arrows, caused by the forcing regime of the counter-rotating impeller/electrodes 3,4 and the axial suction pump 10 (not shown). Light fraction products of electrolysis of the carbonaceous feed for nanotube synthesis are continuously stripped out of the processing zone through the radial vortices.

A transient filamentary discharge, the jagged line, through the plasma (free electrons e-) is shown between the oppositely charged electrodes. A carbon ion vortex converges to a tight tubular structure by means of the self-tightening of the carbon ion vortex as discussed under FIGS. 11a and 11b. Forces on the carbon ions are the electric force $F_E$ which draws the positively charged ions to the cathode and the magnetic force $F_B$ which draws the ions radially inward toward the vortex axis. Metallic carbon nanotubes are excellent conductors, so the discharge sends electrons through the evolved metallic carbon nanotube away from the plasma and toward the axis a-a, i.e. toward the positively charged carbon ions in the carbon ion vortex and into the incoming feed.

Electron flow into the feed through the evolving nanotube, or other nanostructure, makes the evolving end into a very fine cathode, which reduces carbon dioxide and carbon monoxide near the cathode tip and knits the carbon ion vortex into a cohesive structure having metallic properties as ions fall into the cathode tip and aggregate. Discharges through nonmetallic carbon structures, such as amorphous carbon or semiconductor nanotubes, vaporize these structures because they have higher resistance than metallic carbon nanotubes. Vaporization allows the carbon in defective structures to be recycled into metallic nanotubes. The reactor according to the present invention produces long metallic carbon nanotubes unencumbered with excessive amounts of semiconductor nanotubes, malformed nanotubes, or soot. Suitable means known to the art of fiber synthesis, not shown, beyond or within the periphery of the workspace collect the evolved nanotubes.

The vortex-wall interaction, discussed above in FIG. 6, maintains the evolving cathode tips of the carbon nanotubes dangling in the workspace. The axial rebound jet orients the nanotubes radial to the axis a-a and thereby prevents them from tangling.

Ozone exiting from the periphery along with the nanotubes serves to oxidize imperfections and thus insures high quality nanotubes are produced. Ozone also oxidizes the end caps of carbon nanotubes, functionalizing them for later assembly into useful structures. Ozone is a valuable material in its own right, and readily turns to oxygen with added heat in the gasifier.

FIG. 13a shows the annular magnetic field due to radial current flow in the disk armatures which are the impeller/electrodes 3,4. The field lines are concentric about the axis a-a of rotation of the impeller/electrodes. The direction of the inter-disk annular B field is the same as the direction of rotation of the top impeller/electrode 4. The trans-disk axial B field lines point into the page.

Figure 13B:
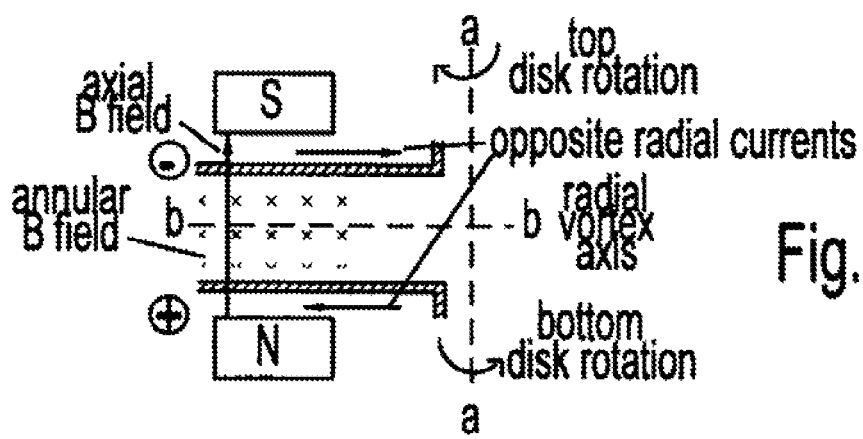
FIG. 13b shows a simplified version of the shear electrolysis process.

FIG. 13b shows a schematic of the shear electrolysis process. The inter-disk annular B field lines point into the page. The electrode/impellers counter-rotate about a common axis a-a and thereby cause radial vortices between them. One radial vortex axis b-b is shown.

Figure 14:
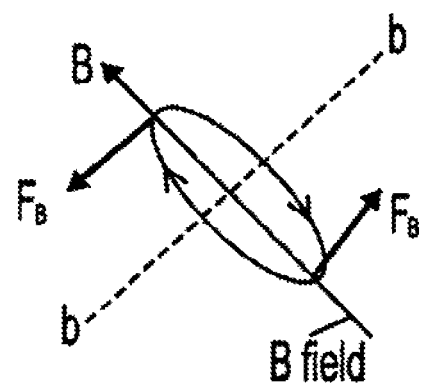
FIG. 14 shows a radial vortex of ions rotating through a magnetic field, and the magnetomechanical annealing of nanotubes caused thereby.

FIG. 14 shows annealing of nanotubes in rotation through magnetic field lines B. The vortex axis of the evolving nanostructure is b-b. Magnetic force $F_B$ on positive species is shown by arrows. The direction of the magnetic force changes with each half rotation of the positive species through the B field, therefore a magnetomechanical vibration is caused by the forced vortices and the B field transverse to the vortices. Vibration annealing of evolving carbon nanotubes and vibration dissociation of carbon dioxide or other molecules may result.

Figure 15:
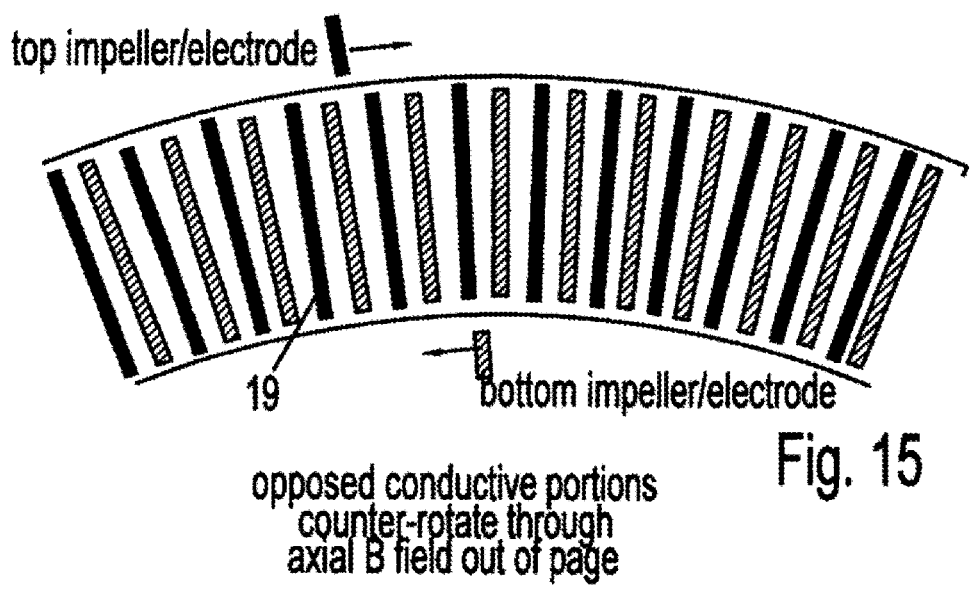
FIG. 15 shows a detail of a radial array of conductive portions on the counter-rotating impeller/electrodes.

FIG. 15 shows opposed counter-rotating conductive portions 19 of the impeller/electrodes. The conductive portions of the top impeller/electrode are shown by solid lines, and the bottom impeller/electrode conductive portions are shown by cross-hatched lines. In this example, the conductive portions 19 are metal bars disposed radial to the impeller/electrode axis of rotation. Counter-rotation of the impeller/electrodes brings the conductive portions of each impeller/electrode into periodic opposition across the workspace. Both sets of conductive portions rotate through an axial magnetic field with field lines pointing out of the page, and thereby opposite radial currents are caused in the metal bars. Rotation of the bars and their associated magnetic fields impels ions to rotate in radial vortices.

Figure 16:
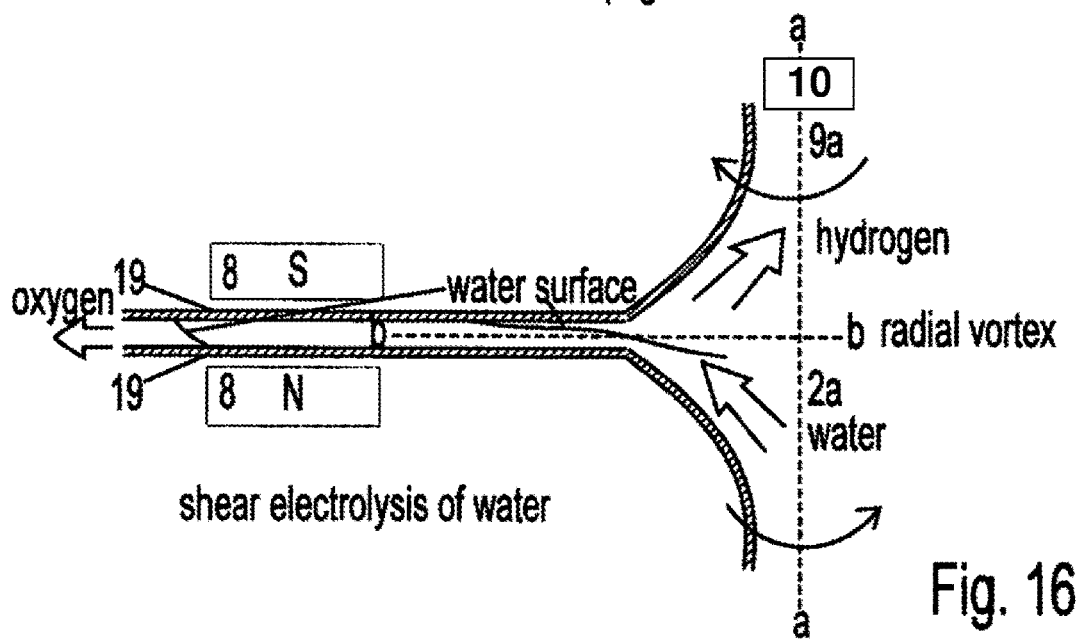
FIG. 16 shows a simplified version of a radial counterflow shear electrolysis reactor used for water electrolysis.

FIG. 16 shows a simplified diagram of the present invention as applied to water electrolysis. No baffle is necessary in this application. A feed of water enters the axial feed port 2a and is centrifugally pumped radially outward from the axis a-a by the counter-rotating electrode/impellers. An axial B field exists between the North and South poles of a magnet 8 straddling conductive portions 19 of the counter-rotating impeller/electrodes. Direction of rotation is shown by curved arrows. Water molecules dissociate into hydrogen and oxygen gas. Hydrogen is advected radially inward toward the axis a-a through cores of radial vortices and is axially extracted through the axial exhaust port 9a. Suitable means for such radially inward advection are the axial suction pump 10 and the vortex-wall interaction. An axis of one radial vortex, which is a sink flow conduit, is b-b. Oxygen, being denser than hydrogen, is centrifugated away from the vortex cores and cannot follow the hydrogen. Oxygen from electrolysis concentrates radially outward toward the periphery as the feed of water is cracked in shear electrolysis. Ozone may be produced along with oxygen in this reactor, and follows the path of oxygen radially outward from the axis a-a to collection at the periphery.

FIG. 17 on sheet 8 shows a detail of a substrate 20 disposed across the periphery of the workspace between the impeller/electrodes 3,4 such that it becomes bombarded with nanostructures due to the radial railgun effect discussed above.

Further Remarks

Discussion has focused on carbon dioxide as feed for nanotube synthesis, but alternatively, feed could be methane, VOCs, water, HAPs, or vehicle exhaust. Methane would crack into hydrogen gas and carbon, and the hydrogen gas would be axially extracted as a light fraction product. Hydrogen has a very low molar mass (2 g/mol) so it would concentrate in the vortex cores of the shear layer and be sucked out by the axial pump. Or carbon monoxide could be feed for nanotubes, with oxygen gas being axially extracted. A mixture of methane and carbon dioxide might also be a suitable feed for syngas and nanotube production.

Waste gas, including process gas streams and combustion exhaust, can be the feed. Gaseous pollutants such as hazardous air pollutants (HAPs), carbon dioxide, carbon monoxide, nitrogen oxides (NOx), sulfur oxides (SOx), hydrogen sulfide ($H_2S$), mercaptans, volatile organic compounds (VOCs), chlorofluorocarbons (CFCs), and ammonia, cracked by shear electrolysis, yield the valuable light fraction electrolysis products hydrogen, oxygen, carbon, and sulfur. Light fractions axially extracted would include products of electrolysis having a lower molar mass than the feed, such as hydrogen, as well as nitrogen ballast and water vapor in flue gas or other waste gas feed. Heavy fractions, such as elemental carbon, elemental sulfur, mercury, dust, and fly ash, would exit the periphery as feed flows in and light fractions are axially extracted. Centrifugal separation of the fractions in the radial counterflow forcing regime allows for high flow rates.

Hot waste gas streams, such as flue gas, motor exhaust, gas turbine exhaust, and process vapor, could be cracked using the feed heat to augment the energy input from the electric field and from the shear to get to the requisite energy to overcome the bond energy of the pollutant to be cracked. This would eliminate the need for scrubbers and their attendant wastewater and sludge disposal problems. Fly ash would scour the electrodes and prevent coking.

The present invention discloses a reactor for continuous shear electrolysis to convert carbon dioxide into syngas on a scale sufficient to provide an alternative to carbon sequestration for addressing global climate change. By continuous is meant that, while it operates, feed enters and products leave, in a steady flow-through process. Continuous does not necessarily mean that it is on all the time. The opposite is a batch process, where feed stops while the batch is worked on, then the products are dumped, then more feed is introduced for the next batch.

Shear electrolysis is a new concept using the combination of mechanical energy and electrical energy, added to the enthalpy of the feed, to crack molecules such as carbon dioxide and water while preventing electrode erosion and efficiently extracting electrolysis products in radial counterflow. Examples are given, not as limitations, but to illustrate important applications of the invention. Carbon sequestration is a major unsolved problem in global climate change, and shear electrolysis can solve it.

A dual disk dynamo assembly is shown in FIG. 1 and FIG. 2. Parallel coaxial counter-rotating impeller/electrodes 3,4 become parallel disk dynamos and oppositely-charged electrodes bounding a workspace between them when they rotate about their common axis a-a through transverse magnetic field lines. Counter-rotation through a common transverse magnetic field is shown in FIG. 1 and FIG. 2. The field lines there are from a single electromagnet having its poles straddling both impeller/electrodes. Alternatively, each impeller/electrode could have its own straddling magnet or each impeller/electrode could be charged by a sliding contact communicating with a current source. Many different arrangements of straddling magnets could be used, such as opposed rings of multiple small-radius helical electromagnets, or opposed coils having a wide radius. These embodiments of the impeller/electrodes, and other equivalents, are intended to be covered by the claims.

Counter-rotation of the impeller/electrodes through the transverse magnetic fields of straddling magnets of whatever type makes current flow radially in or out with respect to the impeller axis of rotation, according to known principles of the Faraday disk, or disk dynamo. The opposite flow of current in the counter-rotating impeller/electrodes creates an opposite charge on them and therefore creates an electric field across the workspace. The rippled contour of the counter-rotating electrodes causes this electric field to pulse. See FIGS. 8a and 8b.

Means for causing the impeller/electrodes to counter-rotate could be one or more peripheral drive wheels 15 connected to motors, as shown in FIG. 1 and especially FIG. 2, or separate drive means connected to each impeller/electrode, such as a belt drive connected to an electric motor, for example. The advantage of peripheral drive wheels is simplicity, high torque, durability, the fact that they provide means for driving nearly exact counter-rotation of the impeller/electrodes, and the fact that they provide means for keeping the impeller/electrodes separated despite the attractive force from their opposite charges.

The centrifugal pumping of the counter-rotating impeller/electrodes, which advect fluid radially outward from the axis a-a, provides means for introducing feed flow through the axial feed conduit and into the workplace. Additional means could be provided by one or more feed pumps upstream of the axial feed conduit. By advection is meant causing flow by pressure or in response to mechanical means.

A baffle is not an essential element of the present invention, but for treatment of gaseous feed a baffle is preferred. The baffle 5 can either be attached to the impeller/electrode having the axial feed port 2a, so as to form part of a centrifugal pump, or may be statically disposed between the axial feed port 2a and the axial exhaust port 9a. The baffle provides means for preventing flow directly from the axial feed port to the axial exhaust port so that feed is advected by the impeller/electrodes radially outward. A static baffle can also include nozzles or other means for directing the suction from the axial suction pump more directly toward the inward-pointing vortex cores, to draw out their contents for the axial exhaust, while excluding the regions with heavier products which surround them.

The radial vortices in the shear layer of the workspace, in combination with the suction of an axial suction pump and/or the vortex-wall interaction, provide means for advecting light fractions radially inward toward the axis a-a simultaneously as the feed is advected radially outward through the workspace by the centrifugal pumping of the counter-rotating impeller/electrodes. The light fractions go radially inward through the vortex cores, while the feed flows radially outward around the vortex cores, in radial counterflow through the workspace driven by the rotation of the impeller/electrodes 3,4 and the suction of the axial suction pump 10 acting through the axial exhaust conduit 9. The light fractions flow through the vortex cores and out the axial exhaust conduit continuously as feed flows into the workspace through the axial feed conduit 2. This is a radial counterflow forcing regime.

The radial counterflow forcing regime which drives light fractions radially inward also provides means for advecting heavy fractions radially outward from the axis a-a and out of the periphery of the workspace continuously as feed flows into the workspace through the axial feed conduit 2. The centrifugal pumping action of the impeller/electrodes transfers momentum to fluid against their surfaces, which is rich in feed and heavy fraction products due to centrifugal separation in the vortices of the shear layer. Radially outward from the axis a-a, the fluid is increasingly rich in heavy fraction products because the feed is electrolyzed and the light fraction products (for example, syngas) are being stripped radially inward. At the periphery, it is the heavy fraction products (for example, ozone and elemental carbon) which predominate. Beyond the rim of the impeller/electrodes, where the periphery ends, the heavy fraction products extrude and can be captured for use. Of particular interest is embedding of nanostructures in a substrate.

Oxygen produced by electrolysis can be recovered out of the periphery and reused for IGCC plants, saving the expense of separating oxygen from air, so the present invention provides means for oxygen as well as carbon recycling. By separating electrolysis products from the electrodes and from the feed in radial counterflow, reverse reactions of products back into feed are prevented, and the forward electrolysis reactions are favored. The oxygen can even be further oxidized into ozone out of the periphery of this reactor.

Elemental carbon, as soot, graphite, or fullerenes, is another valuable byproduct of the reactor. Carbonaceous feed for carbon nanotube production includes carbon dioxide, methane, propane, and other organic compounds. Hydrogen from methane electrolysis is stripped radially inward and carbon is advected radially outward and extruded in high shear out the periphery of the workspace between the counter-rotating oppositely charged impeller/electrodes. Feed for the reactor to produce nanotubes could be introduced already ionized from another reactor, so that no electrolyzing means would be needed. The closely spaced counter-rotating disks would provide the fine scale vortices, radially aligned instead of jumbled together as in conventional isotropic turbulence, for rolling up the ions into nanotubes, annealing them, weeding out defective or non-conductive nanotubes, and extruding long fibers from the periphery in a continuous process. Carbon nanotubes shot like spears out of the periphery due to the radial railgun effect might embed in a substrate.

The vortex-wall interaction and the work of the axial suction pump drive hydrogen and other light fraction products of electrolysis radially inward through the vortex cores of the shear layer and out of the workspace continuously as feed is introduced through the axial feed port. Feed could be ionized prior to its introduction into the workspace by suitable means. The extremely small scale vortices at the periphery of the workspace, where the electrode/impellers are closely separated, roll up the ionized feed into long coherent nanotubes, nanowires, or other nanostructures (collectively, nanostructures).

Magnetomechanical annealing of nanostructures occurs as radial vortices of ions revolve in the magnetic field between the counter-rotating impeller/electrodes. Opposite radial currents in conductive portions of the impeller/electrodes cause magnetic fields. Field lines sweeping into ions of vortices impel rotation and tighten the nanostructures which are being extruded out of the periphery.

For water electrolysis, hydrogen (2 g/mol) is stripped radially inward as the light fraction product, and oxygen is advected radially outward, perhaps as ozone, and is recovered out of the periphery of the workspace. Liquid water displaces the gaseous electrolysis products at the surface of the electrode/impellers because liquid water is denser than the gaseous products and therefore flows in a boundary layer against the electrode/impellers as it is centrifugally pumped between them in high shear. The shear layer is where the gaseous products collect, and the vortices of the shear layer centrifugally separate oxygen and hydrogen, with hydrogen flowing radially inward through the vortex cores to axial extraction, and oxygen flowing radially outward through the periphery. Oxygen is further oxidized into ozone recovered at the periphery.

The present invention provides means for carbon and oxygen recycling at electric power plants and other emitters of carbon dioxide. It also provides means for high volume cracking of pollutants and for recovering valuable materials such as carbon nanotubes and hydrogen, turning trash into treasure.

The invention claimed is:

1. A steady, flow-through method of shear electrolysis, comprising:
   receiving axially injected gas feed into a workspace defined between counter-rotating, coaxial, oppositely-charged, approximately disk-shaped impeller/electrodes;
   advecting the gas feed radially outward through the workspace while simultaneously shearing the gas feed between the impeller/electrodes to form a shear gas feed layer in the workspace;
   generating gaseous turbulence in the shear gas feed layer;
   causing mechanical stress from the turbulence on molecular bonds of the gas feed in the shear gas feed layer;
   causing electrical stress on the molecular bonds of the gas feed in the shear gas feed layer from the counter-rotation of the oppositely-charged, disk-shaped impeller/electrodes;
   causing gaseous light fraction products to separate from the shear gas feed layer radially inward toward an axis of rotation of the impeller/electrodes resulting from at least one of the mechanical and electrical stress applied to the shear gas feed layer;
   axially extracting the gaseous separated light fraction products from the workspace;
   causing heavy fraction products to separate from the shear gas feed layer toward a periphery of the workspace resulting from at least one of the mechanical and electrical stress applied to the shear gas feed layer; and
   extracting the separated heavy fraction products from the periphery of the workspace.

2. The method of claim 1, wherein the gas feed includes carbon dioxide and the light fraction products include carbon monoxide and hydrogen.

3. The method of claim 1, wherein the gas feed includes water vapor, the light fraction products include hydrogen, and the heavy fraction products include oxygen.

4. The method of claim 1, wherein the heavy fraction product includes ozone.

5. The method of claim 1, wherein the heavy fraction products include nanostructures of at least one of carbon, boron nitride, gold, metal dichalcogenides (MX2 (M=Mo, W, Nb, Ta, Hf, Ti, Zr, Re; X=S, Se)), metal oxides, and metal dihalides.

6. The method of claim 1, wherein the gas feed includes a carbonaceous gas.

7. The method of claim 1, wherein the gas feed includes at least one of hydrogen sulfide (H2S), ammonia (NH4), mercaptans, and chlorofluorocarbons (CFCs).

8. The method of claim 1, wherein a workspace-facing surface of both impeller/electrodes is rippled, and wherein generating the gaseous turbulence in the shear gas feed layer is caused by the rippled surfaces of the impeller/electrodes.

9. The method of claim 1, further comprising:
   injecting the gaseous separated light fraction products as a second gas feed into a second workspace defined between second counter-rotating, coaxial, oppositely-charged, approximately disk-shaped impeller/electrodes;
   advecting the second gas feed radially outward through the second workspace while simultaneously shearing the second gas feed between the second impeller/electrodes to form a second shear gas feed layer in the second workspace;
   generating secondary gaseous turbulence in the second shear gas feed layer;
   causing secondary mechanical stress from the secondary gaseous turbulence on molecular bonds of the second gas feed in the second shear gas feed layer;
   causing secondary electrical stress on the molecular bonds of the second gas feed in the second shear gas feed layer from the counter-rotation of the second oppositely-charged, disk-shaped impeller/electrodes;
   causing secondary gaseous light fraction products to separate from the second shear gas feed layer radially inward toward a second axis of rotation of the second impeller/electrodes resulting from at least one of the mechanical and electrical stress applied to the second shear gas feed layer;
   axially extracting the secondary gaseous separated light fraction products from the second workspace;
   causing secondary heavy fraction products to separate from the second shear gas feed layer toward a periphery of the second workspace resulting from at least one of the mechanical and electrical stress applied to the second shear gas feed layer; and
   extracting the separated secondary heavy fraction products from the periphery of the second workspace.

10. A method of forming carbon nanostructures, comprising:
    receiving axially injected carbon dioxide gas feed into a workspace defined between counter-rotating, coaxial, oppositely-charged, approximately disk-shaped impeller/electrodes, the workspace decreasing in separation extending toward a pinched periphery of the impeller/electrodes;
    advecting the carbon dioxide gas feed radially outward through the workspace toward the periphery of the impeller/electrodes while simultaneously counter-rotating the impeller/electrodes through a magnetic field;
    causing the carbon dioxide gas feed to shear between the impeller/electrodes from the counter-rotation of the impeller/electrodes;
    forming a shear layer of carbon dioxide gas feed in the workspace caused by the carbon dioxide gas feed shearing;
    generating gaseous turbulence of the carbon dioxide gas feed in the shear layer;
    causing separation of the carbon dioxide gas feed in the shear layer into gaseous light fraction products and heavy fraction products;
    causing the separated gaseous light fraction products to move radially inward toward an axis of rotation of the impeller/electrodes;
    causing the separated heavy fraction products to move toward the pinched periphery of the workspace;
    axially extracting the gaseous light fraction products from the workspace;

forming carbon nanostructures from the heavy fraction products in the shear layer within the workspace in a direction toward the pinched periphery between the impeller/electrodes.

11. A method of continuous shear electrolysis of a gas feed, comprising the simultaneous steps of:
(a) axially injecting the gas feed into a workspace between counter-rotating coaxial oppositely charged approximately disk shaped impeller/electrodes;
(b) advecting the gas feed radially outward through the workspace while simultaneously shearing the feed between the impeller/electrodes to form a shear layer in the workspace;
(c) advecting gaseous light fraction products of electrolysis radially inward toward the axis of rotation of the impeller/electrodes through cores of radial vortices in the shear layer;
(d) axially extracting the gaseous light fraction products of electrolysis from the workspace; and
(e) peripherally extracting heavy fraction products of electrolysis from the workspace.

12. The method of claim 11, wherein the gas feed is a mixture of carbon dioxide and water, and the gaseous light fraction products of electrolysis include carbon monoxide and hydrogen.

13. The method of claim 11, wherein the gas feed is water vapor, the gaseous light fraction product of electrolysis is hydrogen, and the heavy fraction product of electrolysis is oxygen.

14. The method of claim 11, wherein the heavy fraction product of electrolysis includes ozone.

15. The method of claim 11, wherein the heavy fraction products of electrolysis include nanostructures of materials selected from the group consisting of carbon, boron nitride, gold, metal dichalcogenides ($MX_2$ (M=Mo, W, Nb, Ta, Hf, Ti, Zr, Re; X=S, Se)), metal oxides, and metal dihalides.

16. The method of claim 11, wherein the gas feed comprises carbonaceous compounds selected from the group consisting of carbon monoxide (CO), methane ($CH_4$), alkanes, carbon dioxide ($CO_2$), and volatile organic compounds (VOCs).

17. The method of claim 11, wherein the gas feed comprises compounds selected from the group consisting of hydrogen sulfide ($H_2S$), ammonia ($NH_4$), mercaptans, and chlorofluorocarbons (CFCs).

18. The method of claim 11, wherein the disk impeller/electrodes have a rippled surface comprising peaks and valleys, the counter-rotation of the disk impeller/electrodes causing the peaks on an upper impeller/electrode to periodically oppose peaks on a lower impeller/electrode thereby causing a pulsed electrical discharge from the opposed peaks, the pulsed electrical discharge causing electrolysis in the feed fluid in the workspace.

* * * * *